(12) United States Patent
Ecco et al.

(10) Patent No.: US 12,743,281 B2
(45) Date of Patent: Sep. 22, 2026

(54) INSTRUCTION FETCHING

(71) Applicant: Arm Limited, Cambridge (GB)

(72) Inventors: Leonardo Luiz Ecco, Antibes (FR); Guillaume Bolbenes, Vallauris (FR); Thibaut Elie Lanois, Peymeinade (FR); Benoît Henri Pierre-Marie Matthieu Wallon, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/754,594

(22) Filed: Jun. 26, 2024

(65) Prior Publication Data

US 2026/0003627 A1 Jan. 1, 2026

(51) Int. Cl.
*G06F 9/30* (2018.01)
*G06F 9/38* (2018.01)

(52) U.S. Cl.
CPC ........ *G06F 9/3802* (2013.01); *G06F 9/30047* (2013.01); *G06F 9/3804* (2013.01)

(58) Field of Classification Search
CPC ... G06F 9/3802; G06F 9/30047; G06F 9/3804
See application file for complete search history.

(56) References Cited

U.S. PATENT DOCUMENTS 7,359,890 B1 * 4/2008 Ku .................... G06F 16/24552
8,255,631 B2 * 8/2012 Chen .................. G06F 12/0862 712/225
9,904,624 B1 2/2018 Huberty et al.
10,296,460 B2 5/2019 Sudhir
10,474,578 B2 11/2019 Lee
2005/0076181 A1 4/2005 Hsu
2006/0179238 A1 * 8/2006 Griswell ............ G06F 9/30043 712/E9.047

(Continued)

FOREIGN PATENT DOCUMENTS

KR 10-2014-0134421 11/2014
KR 10-2022-0106212 7/2022

OTHER PUBLICATIONS

U.S. Appl. No. 18/129,979, filed Apr. 3, 2023, Lee et al.

(Continued)

*Primary Examiner* — Corey S Faherty
(74) *Attorney, Agent, or Firm* — NIXON & VANDERHYE P.C.

(57) ABSTRACT

There is provided an apparatus, a method, a chip containing product, a system and a medium. The apparatus is provided with an instruction fetch queue for storage of instruction fetch entries, and prefetching circuitry configured, for each instruction fetch entry and in response to a determination that a block of instructions indicated by that instruction fetch entry is not present in instruction storage circuitry, to issue a request to fetch the block and to cause the block to be allocated to the instruction storage circuitry. The apparatus is also provided with control circuitry configured to suppress issuing the request in response to a number of outstanding requests meeting or exceeding a variable throttling threshold. The control circuitry is configured to derive the variable throttling threshold from properties of previously fetched blocks, the properties determined before or during storage of the previously fetched blocks in the instruction storage circuitry.

20 Claims, 17 Drawing Sheets

(56) References Cited

U.S. PATENT DOCUMENTS

| | | | | |
|---|---|---|---|---|
| 2013/0013867 | A1 | 1/2013 | Manne | |
| 2014/0108740 | A1 | 4/2014 | Rafacz | |
| 2018/0181402 | A1 | 6/2018 | Zhang et al. | |
| 2019/0065376 | A1 | 2/2019 | Lee et al. | |
| 2021/0173783 | A1* | 6/2021 | Thyagarajan | G06F 9/3804 |
| 2022/0365879 | A1* | 11/2022 | Kumar | G06F 12/0875 |

OTHER PUBLICATIONS

Office Action dated Jul. 9, 2024 for U.S. Appl. No. 18/129,979, 5 pages.

PCT International Search Report and Written Opinion of the International Searching Authority for PCT/GB2024/050363 mailed May 16, 2024, 14 pages.

Combined Search and Examination Report for GB Application No. 2506656.4 dated Nov. 11, 2025, 8 pages.

Office Action for KR Application No. 10-2025-0078322 issued May 26, 2026, 9 pages.

* cited by examiner

Storage structure counter

| Address location counter | 0 | 1 | 2 | 3 | 4 | 5 | 6 | 7 |
|---|---|---|---|---|---|---|---|---|
| 0 | Aggressive | Aggressive | Aggressive | Aggressive | Aggressive | Moderate | Moderate | Moderate |
| 1 | Aggressive | Aggressive | Aggressive | Aggressive | Moderate | Moderate | Moderate | Light |
| 2 | Aggressive | Aggressive | Aggressive | Moderate | Moderate | Moderate | Light | Light |
| 3 | Aggressive | Aggressive | Moderate | Moderate | Moderate | Light | Light | Light |
| 4 | Aggressive | Moderate | Moderate | Moderate | Light | Light | Light | Light |
| 5 | Moderate | Moderate | Moderate | Light | Light | Light | Light | Light |
| 6 | Moderate | Moderate | Light | Light | Light | Light | Light | Light |
| 7 | Moderate | Light | Light | Light | Light | Light | Light | Light |

FIG. 12

INSTRUCTION FETCHING

TECHNICAL FIELD

The present invention relates to data processing. More particularly the present invention relates to an apparatus, a system, a chip containing product, a method, and a medium.

BACKGROUND

Some apparatuses, for example, data processing apparatuses, are provided with an instruction fetch queue to store instruction fetch entries indicating blocks of instructions to be fetched. Requests to fetch the blocks of instructions indicated in the instruction fetch queue may be issued in response to a determination that those blocks of instructions are not present in instruction storage circuitry.

SUMMARY

According to a first aspect of the present techniques there is provided an apparatus comprising:

an instruction fetch queue for storage of instruction fetch entries;

prefetching circuitry configured, for each of the instruction fetch entries and in response to a determination that a block of instructions indicated by that instruction fetch entry is not present in instruction storage circuitry, to issue a request to fetch the block of instructions and to cause the block of instructions to be allocated to the instruction storage circuitry; and control circuitry configured to operate in a first operation mode, wherein when operating in the first operation mode, the control circuitry is configured to suppress issuing the request in response to a number of outstanding requests to fetch blocks of instructions meeting or exceeding a variable throttling threshold, wherein the control circuitry is configured to derive the variable throttling threshold from properties of one or more previously fetched blocks of instructions, the properties determined before or during storage of the one or more previously fetched blocks of instructions in the instruction storage circuitry.

According to a second aspect of the present techniques there is provided a system comprising:

the apparatus according to the first aspect, implemented in at least one packaged chip;

at least one system component; and a board, wherein the at least one packaged chip and the at least one system component are assembled on the board.

According to a third aspect of the present techniques there is provided a chip-containing product comprising the system according to the second aspect, wherein the system is assembled on a further board with at least one other product component.

According to a fourth aspect of the present techniques there is provided a method comprising:

storing instruction fetch entries in an instruction fetch queue;

for each of the instruction fetch entries and in response to a determination that a block of instructions indicated by that instruction fetch entry is not present in instruction storage circuitry, issuing a request to fetch the block of instructions and causing the block of instructions to be allocated to the instruction storage circuitry; and deriving a variable throttling threshold from properties of one or more previously fetched blocks of instructions, the properties determined before or during storage of the one or more previously fetched blocks of instructions in the instruction storage circuitry; and when operating in the first operation mode suppressing issuing the request in response to a number of outstanding requests to fetch blocks of instructions meeting or exceeding the variable throttling threshold.

According to a fifth aspect of the present techniques there is provided a non-transitory computer-readable medium storing computer-readable code for fabrication of an apparatus comprising:

an instruction fetch queue for storage of instruction fetch entries;

prefetching circuitry configured, for each of the instruction fetch entries and in response to a determination that a block of instructions indicated by that instruction fetch entry is not present in instruction storage circuitry, to issue a request to fetch the block of instructions and to cause the block of instructions to be allocated to the instruction storage circuitry; and control circuitry configured to operate in a first operation mode, wherein when operating in the first operation mode, the control circuitry is configured to suppress issuing the request in response to a number of outstanding requests to fetch blocks of instructions meeting or exceeding a variable throttling threshold, wherein the control circuitry is configured to derive the variable throttling threshold from properties of one or more previously fetched blocks of instructions, the properties determined before or during storage of the one or more previously fetched blocks of instructions in the instruction storage circuitry.

BRIEF DESCRIPTION OF THE DRAWINGS

The present invention will be described further, by way of example only, with reference to configurations thereof as illustrated in the accompanying drawings, in which:

FIG. 12 schematically illustrates throttling according to some configurations of the present techniques;

DESCRIPTION OF EXAMPLE CONFIGURATIONS

Figure 1:
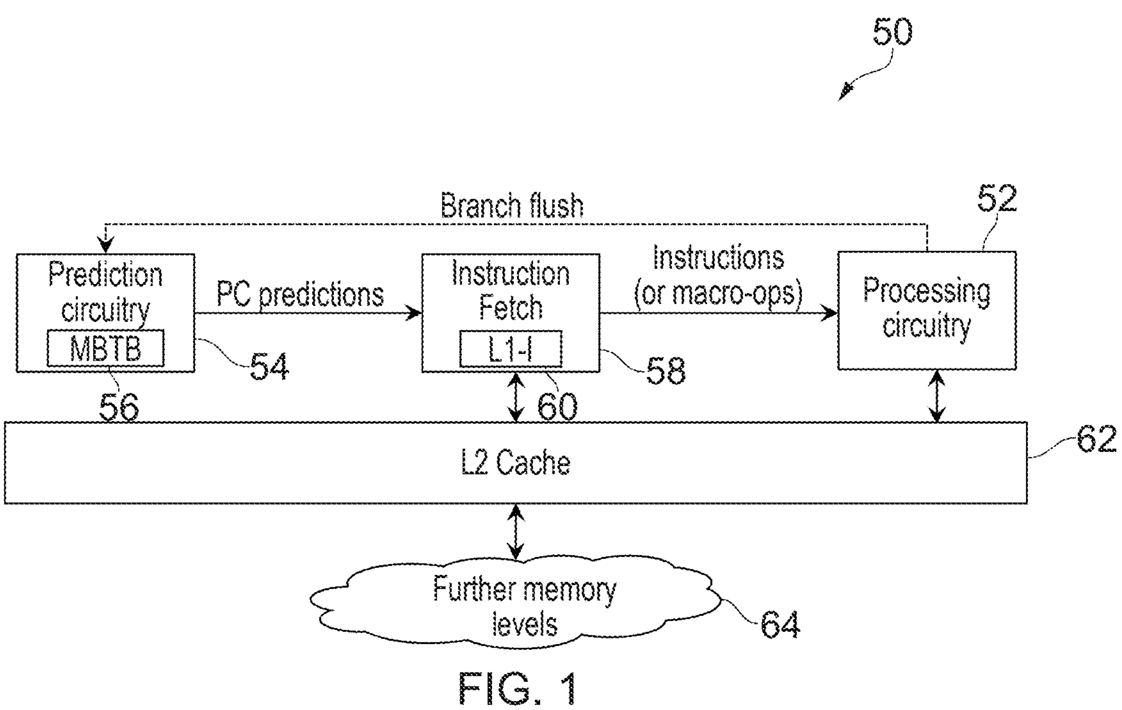
FIG. 1 provides an illustrative example of an apparatus.

Before discussing the configurations with reference to the accompanying figures, the following description of configurations is provided.

According to some configurations of the present techniques there is provided an apparatus comprising an instruction fetch queue for storage of instruction fetch entries. The apparatus is also provided with prefetching circuitry configured, for each of the instruction fetch entries and in response to a determination that a block of instructions indicated by that instruction fetch entry is not present in instruction storage circuitry, to issue a request to fetch the block of instructions and to cause the block of instructions to be allocated to the instruction storage circuitry. The apparatus is also provided with control circuitry configured to operate in a first operation mode. When operating in the first operation mode, the control circuitry is configured to suppress issuing the request in response to a number of outstanding requests to fetch blocks of instructions meeting or exceeding a variable throttling threshold. The control circuitry is configured to derive the variable throttling threshold from properties of one or more previously fetched blocks of instructions, the properties determined before or during storage of the one or more previously fetched blocks of instructions in the instruction storage circuitry.

The apparatus may have a number of circuits that provide instruction fetch entries in the instruction fetch queue. These entries may be provided either speculatively, e.g., based on a prediction that a block of instructions indicated by the instruction fetch entry may be required, or in response to a non-speculative determination that the block of instructions is required in order to continue non-speculative processing. For each instruction fetch entry, the prefetching circuitry first determines whether the block of instructions indicated in that entry is present in instruction storage circuitry, e.g., an instruction cache or shared cache. If the block of instructions is present in the instruction storage circuitry, then the prefetch circuitry does not need to issue a request to fetch the block of instructions (for example, from another level of cache or from main memory). If the block of instructions indicated by the instruction fetch entry is not present in the instruction storage circuitry, then the prefetching circuitry issues a request to fetch the block of instructions (for example, from another level of cache or from main memory). The request to fetch a block of instructions may be, for example, a line fill request issued to a particular cache. The instruction fetch queue may be arranged as a circular buffer which the prefetching circuitry works through sequentially to select instruction fetch entries. The blocks of instructions may be blocks comprising a single instruction or may be blocks containing plural instructions. In general, the blocks of instructions comprise one or more instructions.

In some apparatuses, and in some use cases, the instruction fetch queue may become populated with a large number of entries which can result in the requests to fetch the blocks of instructions being issued at a high rate. Whilst this can ensure that the required blocks of instructions are fetched in a timely manner, it can also result in high bandwidth usage and could result in thrashing of the instruction storage circuitry, for example, if the blocks of instructions are fetched so far in advance that they are evicted prior to use. Furthermore, speculatively fetching a large number of blocks of instructions may result in wasted power and effort if, at the time of resolution, the fetched instructions turn out to not be required. There are some situations where it may be beneficial to allow unconstrained issuance of requests to fetch blocks of instructions, and other situations in which it may be beneficial to apply a limit to the number of outstanding requests, e.g., to throttle the rate at which the requests are issued in order to ensure that a total number of outstanding requests does not meet or exceed a limit, i.e., the variable throttling threshold. The inventors have recognised that the definition of a variable throttling threshold, rather than a static throttling threshold provides improved flexibility and can allow the number of outstanding requests to be tuned based on system conditions. The variable throttling threshold may be selected from one of a discrete set of possible values, e.g., a larger threshold (corresponding to a lower level of throttling) or a lower threshold (corresponding to a higher or more aggressive level of throttling). Alternatively, the variable throttling threshold may be selected from a larger group of possible throttling thresholds.

The variable throttling threshold is derived (e.g., determined or calculated) from properties of previously fetched blocks of instructions. In other words, the variable throttling threshold is calculated based on observation of historical information indicative of the previously fetched blocks of instructions. The properties are determined before or during the storage of the previously fetched blocks of instructions and are therefore indicative, for example, of the past performance of the instruction prefetching circuitry and/or past program behaviour. Examples of particular properties that may be considered are described below. Using information derived during or before storage of the blocks of instructions provides a greater level of detail of the usage and properties of the blocks of instructions over, for example, considering a more general metric such as a total number of cache evictions.

Whilst the instruction fetch queue, the prefetching circuitry, and the control circuitry are described as separate circuits, it will be readily apparent to the person of ordinary skill in the art that the functional requirements of these circuits may be provided by either separate distinct blocks of hardware or by one or more combined blocks of hardware that together provide the described function. The first operation mode of the control circuitry may, in some configurations, be the only operation mode. However, in alternative configurations, the first operation mode may be one of a plurality of operation modes with an alternative means of deriving or applying the variable throttling threshold used in other ones of the plurality of operation modes. In some configurations, there may be at least one mode of operation in which no variable throttling threshold is applied.

Whilst the variable throttling threshold could be applied to all of the instruction fetch entries, in some configurations, the apparatus comprises prediction circuitry configured to allocate the instruction fetch entries based on results of predictions of branch instructions and to indicate, for each of the instruction fetch entries, whether the block of instructions that instruction fetch entry is predicted to contain at least one branch instruction, wherein: the number of outstanding requests is a number of outstanding requests issued for instruction fetch entries allocated to the instruction fetch queue subsequent to a previously allocated youngest instruction fetch entry predicted to contain at least one branch instruction. The control circuitry is configured to identify a youngest instruction fetch entry that is predicted to contain at least one branch instruction. The identification may identify a youngest instruction fetch entry comprising a predicted taken branch or a youngest instruction fetch entry comprising a predicted non-taken branch. The control circuitry suppresses issuing of requests when the number of outstanding requests that occur subsequent to a previously allocated youngest instruction fetch entry that is predicted to contain at least one branch instruction exceeds the variable throttling threshold. In this way a rolling window of requests for blocks of instructions is defined starting with the previously allocated youngest instruction fetch entry and including a number of instruction fetch entries defined by the variable throttling threshold. When an instruction fetch entry that contains a predicted branch and that is younger than the previously allocated youngest instruction fetch entry is encountered within the rolling window of instructions, then the control circuitry is configured to update the start of the rolling window based on the newly identified instruction fetch entry. The rolling window therefore allows a maximum number of outstanding requests subsequent to the identification of an instruction fetch entry predicted to be a branch instruction. As the outstanding requests complete, then the rolling window is updated. In other words, the variable throttling threshold limits the outstanding requests that can be issued at a given time rather than limiting the total number of instruction fetch entries that can be allocated.

In some configurations, the control circuitry is configured to update the rolling window on each cycle and is responsive to a determination that an instruction fetch entry has been deallocated, from the instruction fetch queue, to update rolling window to include a sequentially next instruction fetch entry in the instruction fetch queue. In other words, once a block of instructions indicated in an outstanding request is returned and the instruction fetch entry is deallocated, the rolling window is updated to enable a further request for a block of instructions indicated in a further instruction fetch entry to be issued. When an instruction fetch entry indicating a predicted branch instruction is identified within the rolling window a request based on that instruction fetch entry is issued and the window is updated to enable a number of requests to be issued (limited by the variable throttling threshold) subsequent to that fetch entry indicating a predicted branch instruction. This approach ensures that, subsequent to a change in instruction flow due to a branch instruction, the prefetching circuitry is able to ensure that a number of instruction blocks (limited by the variable throttling threshold) are quickly fetched whilst limiting the overall number of outstanding requests. As a result, the availability of blocks of instructions subsequent to a branch instruction is improved whilst ensuring that the overall bandwidth usage is constrained.

In some configurations the control circuitry comprises counter storage circuitry configured to store one or more counter values, and the control circuitry is configured: to update each one of the one or more counter values in dependence on the properties meeting a predefined condition associated with that one of the one or more counter values; and to derive the variable throttling threshold by applying one or more thresholds to the one or more counter values. The counters can therefore be used to determine occurrences of events, e.g., when the properties meet a predefined condition, and the variable throttling threshold can be derived from the counters. In some configurations, the variable throttling threshold may take one of two values, a high level of throttling and a low level of throttling based on whether the counter meets or exceeds the one or more thresholds. In other configurations, plural thresholds may be defined with a graded level of throttling provided. In some configurations, the variable throttling threshold may be derived by taking a more significant portion of the counter, for example, when if the counter is provided as an 8-bit saturating counter, the variable throttling threshold may be determined by the most significant bit of the saturating counter. Alternatively, the most significant two bits of the counter could be used to select one of four possible throttling thresholds. The throttling thresholds may be calculated by applying an arithmetic operation to the counter or by using the counter (or a subset of the bits of the counter) to index into a look up table.

In some configurations the control circuitry is configured to derive the properties during measurement windows comprising a predetermined number of issued requests to fetch blocks of instructions, and to update each of the one or more counter values subsequent to each one of the measurement windows. The measurement windows are defined based on the predetermined number of issued requests and the counter values are updated subsequent to each of the measurement windows. The counters may be updated based on a total number of previously fetched blocks of instructions having properties meeting a predefined condition, or based on an average value of the properties of the previously fetched blocks of instructions.

In some configurations the properties comprise location data indicative of locations from which one or more previous blocks of instructions were fetched. The locations may be defined as absolute locations specifying the specific location from which the one or more previous blocks of instructions were fetched or a relative location indicative of locations from which the one or more previous blocks of instructions were fetched relative to a specified location. The specified location may be based on the location of a further instruction or block of instructions.

In some configurations the control circuitry is responsive to the location data indicating that the locations exceed a location threshold, to decrease the variable throttling threshold; and the control circuitry is responsive to the location data indicating that the locations do not exceed a location threshold, to increase the variable throttling threshold. Therefore, when the location data indicates that the locations are further than the location threshold, the variable throttling threshold is decreased (more aggressive throttling) and when the locations do not exceed the location threshold, the variable throttling threshold is increased (less aggressive throttling). The inventors have recognised that location data can be indicative of a cost associated with the block of instructions being fetched. A location that exceeds the location threshold may indicate that the cost associated with that instruction is high and, as a result, the variable throttling threshold is decreased to reduce the number of blocks of instructions being fetched that may incur that cost. Alternatively, when the location does not exceed the location threshold, the cost may be considered reasonable and the variable throttling threshold may be increased to allow a greater number of blocks to be fetched.

The location data may relate to any location data associated with the block of instructions as will be set out in the examples below. In some configurations the location data comprises storage structure location data indicative of a storage structure from which the one or more previous blocks of instructions were fetched. In other words, the location data may identify a specific storage structure (storage circuitry) in which the previous blocks of instructions were stored prior to being fetched for storage in the instruction storage circuitry. In other words, the storage structure location data identifies the physical hardware circuit from which the block of instructions was retrieved. The location from which the instructions were fetched may be provided along with the instructions as metadata to be read by the control circuitry which may track a number of instructions received from each storage structure.

In some configurations the prefetching circuitry is configured to fetch the block of instructions from a storage structure hierarchy comprising one or more first storage structures and one or more second storage structures, the one or more first storage structures accessible to the prefetching circuitry in fewer clock cycles than the one or more second storage structures; and the control circuitry is configured to determine the storage structure location data based on a number of retrieved blocks of instructions from at least one of the one or more first storage structures and the one or more second storage structures. The one or more first storage structures may be considered as nearby or close storage structures and the one or more second storage structures may be considered as distant or further away storage structures. The cost, in terms of clock cycles, associated with retrieving a block of instructions from one of the one or more first storage structures would typically be lower than the cost associated with retrieving instructions from the one or more second storage structures. When the one or more first storage structures comprises plural storage structures, these may be storage structures that are each accessible in a same number of clock cycles or they may be storage structures each accessible in a different number of clock cycles. Similarly, when the one or more second storage structures comprises plural storage structures, these may be storage structures that are each accessible in a same number of clock cycles or they may be storage structures each accessible in a different number of clock cycles. The one or more first storage structures may include an L2 cache and the one or more second storage structures may comprise all levels of storage that are accessible in a greater number of clock cycles than the L2 cache, e.g., an L3 cache, a system cache, and main memory, e.g., DRAM. Alternatively, the one or more first storage structures may comprise the L2 and the L3 cache with the one or more second storage structures comprising the system cache and DRAM. It will be readily apparent to the skilled person that different cache hierarchies may be provided in different apparatuses and that the techniques disclosed herein could be applied by defining the one or more first storage structures to be any number of cache levels that are closer to the processing circuitry and by defining the one or more second storage structures to be any number of cache levels that are further from the processing circuitry. The location data may therefore be indicative, for each issued request, of whether the block of instructions is retrieved from the one or more first storage structures (e.g., there is a low cost in terms of clock cycles associated with its retrieval) or if it has been retrieved from the one or more second storage structures (e.g., there a high cost in terms of clock cycles associated with its retrieval).

In some configurations the one or more counter values comprises a storage structure counter value; and the predefined condition associated with the storage structure counter value is met when the number of retrieved blocks of instructions from the one or more first storage structures meets or exceeds a storage structure threshold. In other words, the control circuitry is configured to identify when a number of retrieved blocks of instructions from the one or more first storage structures (the nearby or close storage structures) exceeds a storage structure threshold. This identification may be performed over a measurement window. When the number of retrieved blocks of instructions exceeds the storage structure threshold, e.g., subsequent to the measurement window, the storage structure counter value is modified, e.g., increased. As a result, the storage structure counter value is indicative of a number of successive measurement windows in which the number of blocks of instructions retrieved from nearby meets a threshold. In this way, the variable throttling threshold can be increased where blocks of instructions are found to be located nearby (resulting in a smaller latency associated with the retrieval of those blocks) and can be decreased where the blocks of instructions are typically located further away (resulting in a larger latency associated with the retrieval of those blocks).

In some configurations the apparatus comprises prediction circuitry configured to generate the instruction fetch entries based on branch instructions, each of the branch instructions located at a respective program counter address and specifying a respective target address, wherein the location data comprises program counter location data indicative of a difference between the respective program counter addresses and a respective target address. The program counter location data may be provided as part of the location data in addition to the storage structure location data or as an alternative to the storage structure location data. Whilst the storage structure location data provided an indication of the physical storage structure from which the data was retrieved, the program counter location data relates to a location in memory address space, e.g., in virtual address space. In particular, the program counter location data is relative location data indicating how close the respective target address is to the respective program counter address. When a branch instruction is encountered, the program counter of that branch instruction may be stored, for example, in a dedicated register, or at a known location in memory. The program counter location data can then be inferred for each of the instruction fetch entries subsequent to the branch instruction by calculating a difference between the respective program counter address and the address of the block of instructions indicated in that fetch entry. The program counter location data therefore provides an indication of how far away, in address space, the target address is from the respective program counter value. The difference between the respective program counter address of the branch instruction and the respective target address may be measured in terms of individual instructions. Alternatively, the difference may be measured in terms of blocks of instructions.

Whilst in some configurations, the control circuitry is configured to determine the program counter location data only for the fetch entry that is concurrent with the branch instruction, in some configurations the control circuitry is configured to determine the program counter location data for each of the instruction fetch entries.

In some configurations the one or more counter values comprises an address location counter value; and the predefined condition associated with the address location counter value is met when a number of fetch entries for which the difference falls within a predefined range meets or exceeds an address range threshold. As discussed, the difference indicates how far in address space the fetched block of instructions is from the branch instruction. The inventors have recognised that there are some use cases in which at least some of the blocks of instructions retrieved will be the same regardless as to whether the branch is predicted to be taken, predicted to be not taken, or indeed not predicted (which may result in the same blocks being fetched as the case of a predicted not taken branch). In particular, if the difference is small such that the block of instructions retrieved subsequent to a predicted taken branch is close to the branch instruction in address space, then it is more likely that this block of instructions would also need to be retrieved regardless of whether the branch is predicted and regardless as to whether the branch, when predicted, is predicted taken or predicted not taken. In particular, if the branch is a predicted taken branch and indicates a block of instructions that is contiguous with the block of instructions containing the predicted branch instruction, then it is highly likely that the same block of instructions would be required if that branch had been predicted incorrectly and was not taken. However, if the difference was large (e.g., several hundred blocks of instructions), then there is a smaller chance that the same block would be required regardless of whether the branch is taken or not taken. Where there is a greater number of instruction fetch entries for which the difference falls within the predefined range, then there is a greater likelihood that the cost associated with speculatively fetching blocks of instructions would not be wasted (e.g., due to an incorrect prediction). In such cases the potential of wasted effort in speculatively fetching blocks of instructions would be lower (due to the likelihood that those blocks of instructions would be required even if the prediction is incorrect) and the variable throttling threshold could be increased.

The difference may be a positive difference or a negative difference, for example, if the target address is earlier in program counter order than the address of the branch instruction. The determination as to whether the difference falls within the predefined range may therefore be based on an upper and lower limit. In some configurations the predefined range is one of: a symmetric range and the predefined condition is satisfied when the modulus of the difference is less than or equal to a threshold; an asymmetric range bounded from above zero by an upper threshold and from below zero by a lower threshold, wherein the modulus of the lower threshold is different to the modulus of the upper threshold.

In addition to, or as an alternative to, the location data, in some configurations the properties comprise utilisation properties indicative of whether, prior to eviction from the instruction storage circuitry, blocks of instructions selected for eviction from the instruction storage circuitry were forwarded to processing circuitry for execution. The utilisation data may be stored in the form of a single bit indicative as to whether the instructions have been passed to the processing circuitry for execution. On allocation to the instruction storage circuitry, the utilisation data may be set to a first value indicating that the block of instructions has not been passed for execution by the processing circuitry. When the block of instructions is passed to the processing circuitry, the utilisation data may be set to a second value (i.e., different from the first value) to indicate that the associated block of instructions has been used.

In some configurations the one or more counter values comprises a usefulness counter value; and the predefined condition associated with the usefulness counter value is met when the utilisation properties meets or exceeds a utilisation threshold. The utilisation threshold may be met, for example, when the utilisation properties associated with an evicted block of instructions are set to the second value. The usefulness counter may be provided as a saturating counter with the value being modified in a first direction when the utilisation properties associated with the evicted block are set to the first value and modified in a second direction when the utilisation properties associated with the evicted block are set to the second value. For cases in which the blocks of instructions are more likely to be processed by the processing circuitry than not, the usefulness counter will generally be modified in the first direction. For cases in which the blocks of instructions are less likely to be processed prior to eviction, the usefulness counter will generally be modified in the second direction. By selecting a threshold and applying it to the usefulness counter, it can be determined whether the fetched blocks of instructions are generally useful (i.e., if they are generally forwarded for processing by the processing circuitry). When it is determined that the fetched blocks of instructions are generally useful, the variable throttling threshold could be set to a higher value (less aggressive throttling). When it is determined that the fetched blocks of instructions are generally not useful, i.e., they are evicted before they are used, then the variable throttling threshold could be set to a lower value (more aggressive throttling). As a result, the throttling of outstanding fetch requests can be tailored based on whether or not the fetched instructions are fetched in a timely manner so as to be used by processing circuitry prior to eviction.

It will be readily apparent to the skilled person that the variable throttling threshold may be dependent on the utilisation properties and/or the location data where the location data may include the storage structure location data and/or the program counter location data. Furthermore, the variable throttling threshold may also be based on one or more other properties determined before or during storage of the one or more previously fetched blocks of instructions.

In addition to being operable in a first operational mode, in some configurations the control circuitry is configured to operate in a second operational mode, wherein when operating in the second operational mode the control circuitry is configured to issue requests to fetch blocks of instructions independent of the number of the outstanding requests meeting or exceeding the variable throttling threshold. The control circuitry may switch between the first operational mode and the second operational mode in response to any properties and may be based, for example, on a predetermined condition being met, a choice of a programmer or compiler, and/or an execution state of processing circuitry associated with the instruction storage circuitry. For example, in some configurations switching between the first operational mode and the second operational mode may be based on a ratio of branch target buffer misses and/or a number of retired instructions.

In some configurations the control circuitry is configured to switch between the first mode of operation and the second mode of operation in dependence on utilisation properties indicative of whether blocks of instructions evicted from the instruction storage circuitry were forwarded to processing circuitry prior to eviction. For example, where the utilisation properties indicate that the majority of instructions are being forwarded to the processing circuitry for execution, the control circuitry may switch to operating in the second operational mode. Alternatively, when the utilisation properties indicate that a large number of the blocks of instructions are being evicted without being forwarded for execution, then the control circuitry may switch to the first operational mode. In some configurations one or both the switching between the operational modes and the variable throttling threshold may be based on the utilisation properties.

In some configurations the apparatus comprises utilisation information storage circuitry configured to store instruction utilisation information associated with each block of instructions allocated to the instruction storage circuitry, wherein the control circuitry is configured: when allocating a given block of instructions in the instruction storage circuitry, to set the instruction utilisation information associated with the given block of instructions to a first value; in response to the given block of instructions being forwarded to processing circuitry, to set the instruction utilisation information associated with the given block of instructions to a second value different to the first value; and to derive the utilisation properties based on a ratio of the blocks of instructions evicted from the instruction storage circuitry for which the associated instruction utilisation information is set to the first value to the blocks of instructions evicted from the instruction storage circuitry for which the associated instruction utilisation information is set to the second value. The utilisation information storage circuitry may be comprised in the instruction storage circuitry. Alternatively, the utilisation information storage circuitry may be provided as a separate storage structure that is associated with the instruction storage circuitry.

Particular configurations will now be described with reference to the figures.

Figure 2:
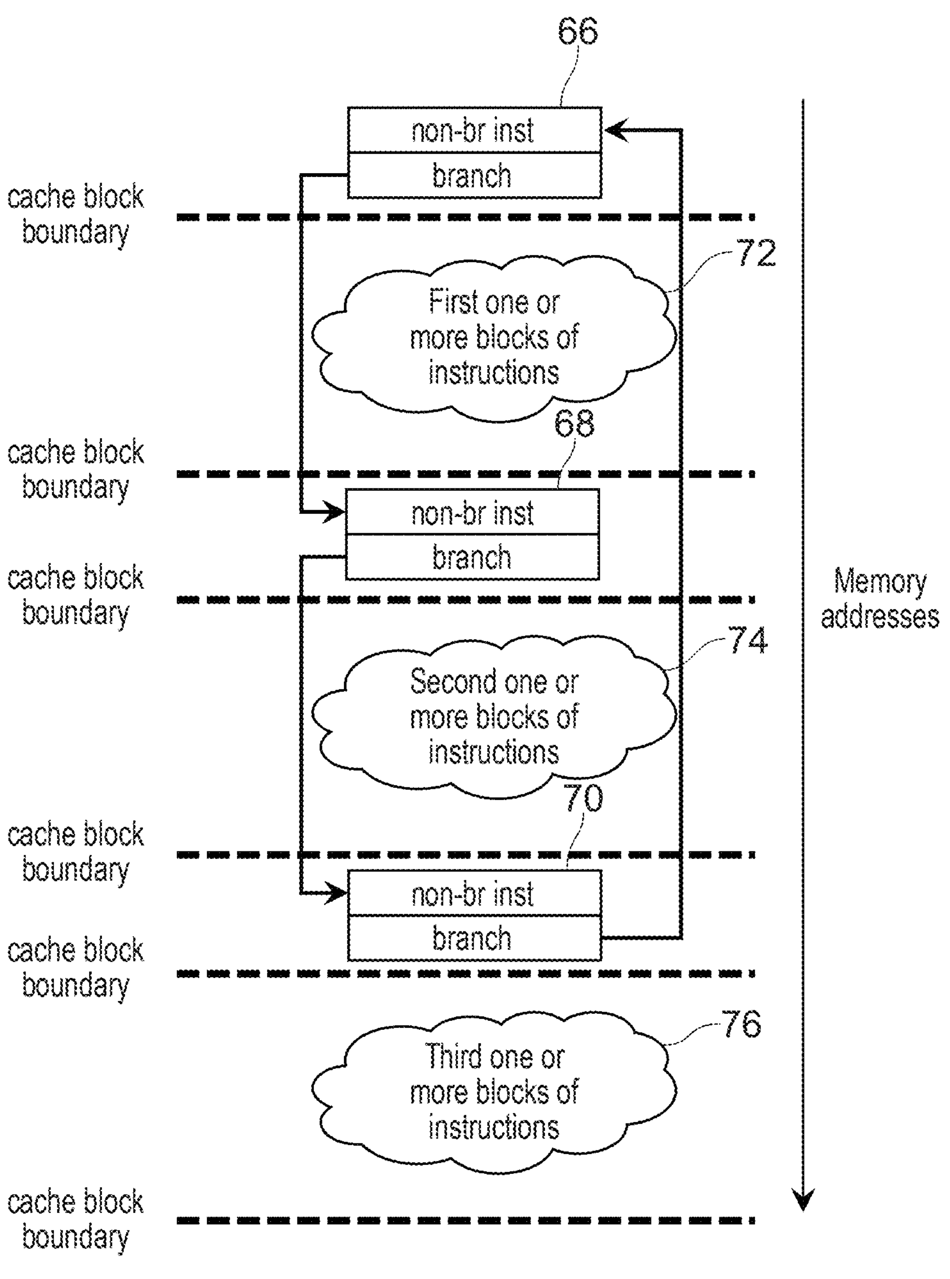
FIG. 2 provides an illustrative example of blocks of multiple instructions.

In order to introduce the techniques disclosed herein, FIGS. 1 and 2 are provided as an illustrative example of a potential problem that may occur when fetching instructions. FIG. 1 schematically illustrates an apparatus 50 that is provided for the purpose of an illustrative example. The apparatus 50 is provided with processing circuitry 52, an instruction fetch queue 58, and prediction circuitry 54. The apparatus 50 also comprises an L2 cache 62 and one or more additional memory levels 64. The prediction circuitry 54 is provided in the form of branch prediction circuitry comprising a main branch target buffer (MBTB) 56. The instruction fetch queue 58 comprises an instruction fetch cache 60. In the illustrative example, it is assumed that the main branch target buffer 56 is fully associative and holds only two branches. The main branch target buffer 56 is also assumed to utilise a least recently used replacement policy. It will be readily apparent to the skilled person that an implementation of such a main branch target buffer 56 may comprise many more entries. In operation, the prediction circuitry 54 generates addresses, i.e., program counter values that are sent to the instruction fetch queue. The instruction fetch queue 58 comprises instruction storage circuitry 60. When the instruction fetch queue 58 receives the generated address, a lookup is triggered in the instruction storage circuitry 60 to determine if the block of instructions associated with that address is present in the instruction storage circuitry 60. If the block of instructions is not present, i.e., a miss in the instruction storage circuitry 60, a line fill request may be issued to request the block of instructions from the L2 cache 62 or, if the block of instructions is not present in the L2 cache 62, from the further memory levels 64.

The processing circuitry 52 retrieves the blocks of instructions from the instruction storage circuitry and executes those instructions. When the processing circuitry 52 identifies a non-predicted branch or an incorrectly predicted branch, then the processing circuitry 52 triggers a flush in the prediction circuitry 54. In particular, the prediction circuitry 54 will update the main branch target buffer 56 on receipt of the flush to record that a branch existed.

As an illustrative example, we consider the sequence of operations schematically illustrated in FIG. 2. In particular, the sequence of instructions comprises a first branching block of instructions 66, a second branching block of instructions 68, and a third branching block of instructions 70. Each of the first branching block of instructions 66, the second branching block of instructions 68, and the third branching block of instructions 70 comprises a branch instruction which, for the sake of this example, is assumed to be taken. The branch instruction in the first branching block of instructions 66 identifies the second branching block of instructions 68 as its target address, the second branching block of instructions 68 identifies the third branching block of instructions 70 as its target address, and the third branching block of instructions 70 identifies the first branching block of instructions 66 as its target address. Following the first branching block of instructions 66, and prior to the second branching block of instructions 68, there is a first one or more blocks of instructions 72. Following the second branching block of instructions 68, and prior to the third branching block of instructions 70, there is a second one or more blocks of instructions 74. Following the third branching block of instructions 66, there is a third one or more blocks of instructions 74.

In operation, when the first branching block of instructions 66 is encountered by the prediction circuitry 54, there is nothing in the main branch target buffer 56 to indicate an outcome of the branch instruction, and the prediction circuitry will incorrectly trigger a fetch of the first one or more blocks of instructions 72. Once the processing circuitry 52 executes the branch instruction in the first branching block of instructions 66, the mistake is realised and the main branch target buffer 56 is updated. The program counter is set to point to the second branching block of instructions 68, and execution continues. At this point there is information identifying an outcome of the first branching block of instructions in the main branch target buffer 56.

The prediction circuitry 54 also has no information in the main branch target buffer 56 to indicate an outcome of the branch instruction in the second branching block of instructions 68. As in the case of the first branching block of instructions 66, the prediction circuitry will incorrectly trigger a fetch of the second one or more blocks of instructions 74. Once the processing circuitry 52 executes the branch instruction in the second branching block of instructions 68, the mistake is realised and the main branch target buffer 56 is updated. The program counter is set to point to the third branching block of instructions 70, and execution continues. At this point there is information identifying an outcome of the first branching block of instructions and the second branching block of instructions in the main branch target buffer 56.

The prediction circuitry 54 also has no information in the main branch target buffer 56 to indicate an outcome of the branch instruction in the third branching block of instructions 70. As in the case of the first branching block of instructions 66, the prediction circuitry will incorrectly trigger a fetch of the third one or more blocks of instructions 76. Once the processing circuitry 52 executes the branch instruction in the third branching block of instructions 70, the mistake is realised and the main branch target buffer 56 is updated. Because there are only two entries in the main branch target buffer 56, the least recently updated entry, i.e., the information relating to the first branching block of instructions 66, is evicted. The program counter is set to point to the first branching block of instructions 70, and execution continues. At this point there is information identifying an outcome of the second branching block of instructions and the third branching block of instructions in the main branch target buffer 56.

At this point, the problem is apparent because the information relating to the current branching block of instructions will always be evicted before it is required. As a result, the prediction circuitry 54 triggers repeated requests for the first one or more blocks of instructions, 72, the second one or more blocks of instructions 74, and the third one or more blocks of instructions 76. These blocks of instructions might not be present in the L1 cache and may force the L1 cache to issue a line fill request to the L2 cache (a request to fetch a block of instructions) to retrieve the blocks of instructions into the L1 cache. However, these blocks of instructions are never actually executed and may cause pollution of the L1 cache. In some use cases the first one or more blocks of instructions, 72, the second one or more blocks of instructions 74, and the third one or more blocks of instructions 76 may each comprise several blocks of instructions and the total number of fetched and unused blocks may become very high. This could result in wasted power and cache pollution.

It will be readily apparent to the person of ordinary skill in the art that a larger main branch target buffer, e.g., having N entries could equally run into the same problem if N+1 branching blocks of instructions were encountered. It will also be readily apparent to the person of ordinary skill in the art that this is but one possible example in which blocks of instructions may be redundantly fetched and that other sequences of branch instructions could be used to trigger this behaviour.

Figure 3:
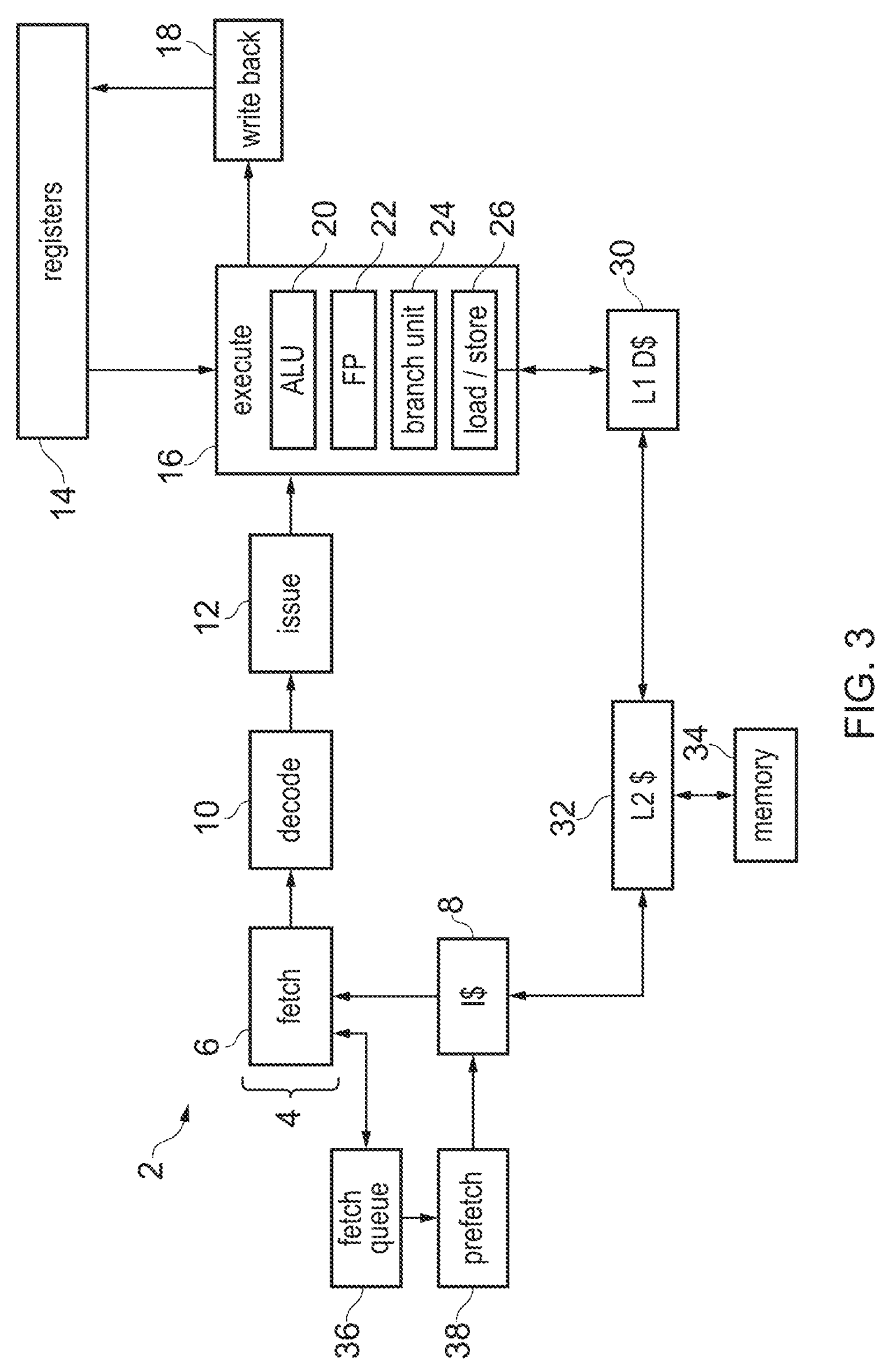
FIG. 3 schematically illustrates an apparatus according to some configurations of the present techniques.

FIG. 3 schematically illustrates an example of a data processing apparatus 2 according to some configurations of the present techniques. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor an additional register renaming stage could be included for mapping architectural registers specified by program instructions or micro- operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. In particular, the processing units include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 26 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

In accordance with the present techniques, there is provided an instruction fetch queue 36 comprising a plurality of instruction fetch entries each indicating a memory address of an instruction. The data processing apparatus 2 is further provided with prefetching circuitry 38 configured to prefetch instructions indicated by the instruction fetch entries, and to cause those instructions to be stored in the instruction cache 8. As a result, when the fetch unit 6 fetches that instruction, it will be already present in the instruction cache 8 and an access to the main system memory 34 will not be necessary.

Figure 4:
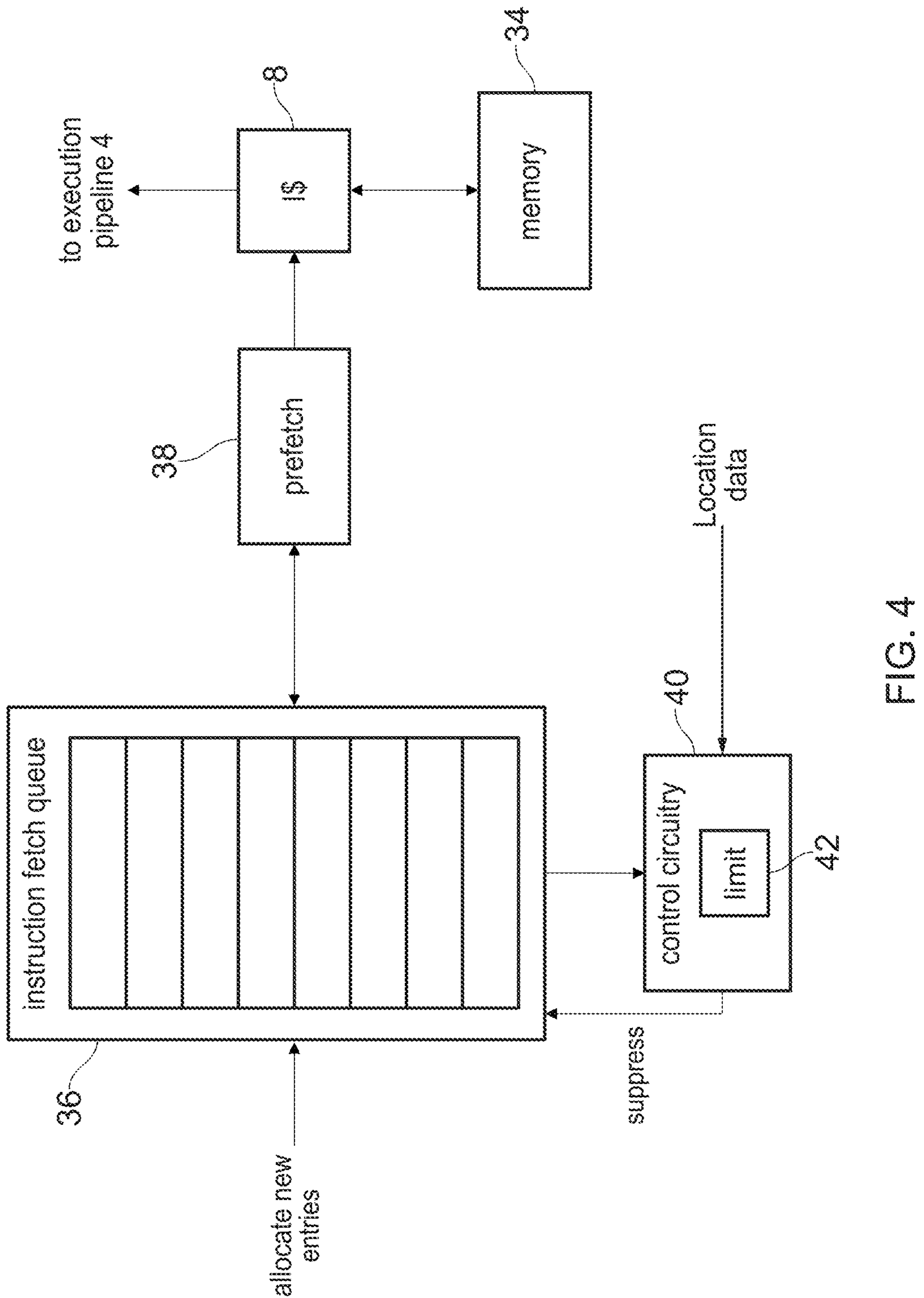
FIG. 4 schematically illustrates an apparatus according to some configurations of the present techniques.

FIG. 4 schematically illustrates more detail of the instruction fetch queue 36 according to the present techniques. In this example, the instruction fetch queue 36 comprises eight instruction fetch entries for ease of illustration, however, it will be appreciated that the instruction fetch queue 36 could comprise any number of instruction fetch entries. The instruction fetch queue 36 may allocate and deallocate entries using a First In, First Out (FIFO) queue, such that instructions are fetched in the order that the corresponding instruction fetch entries are allocated to the instruction fetch queue 36. An instruction fetch entry is deallocated by the prefetching circuitry 38 after a block of instructions corresponding to that entry has been fetched and stored in the instruction cache 8 and when that block of instructions has been forwarded to the decode stage 10.

The instruction fetch queue 36 is coupled with control circuitry 40 which is capable of determining how many requests to fetch blocks of instructions (i.e. line fill requests to the L2 cache 32) are currently outstanding. The control circuitry 40 also stores a limit value 42 (the variable throttling threshold), for example, in a register, the limit value may be determined based on properties of previously stored blocks of instructions prior to or during storage in the instruction storage circuitry 8. The control circuitry 40 compares the limit value 42 to the number of outstanding instruction fetch requests corresponding to instruction fetch entries in the instruction fetch queue 36. If the control circuitry 40 determines that the number of outstanding request to fetch a block of instructions meets or exceeds the limit value 42, the control circuitry 40 suppresses issuing any further requests to fetch blocks of instructions. For example, if the limit value 42 was equal to four, then issuing a request to fetch a block of instructions indicated in the instruction fetch queue would be suppressed until there are fewer than four outstanding requests to fetch blocks of instructions.

Figure 5:
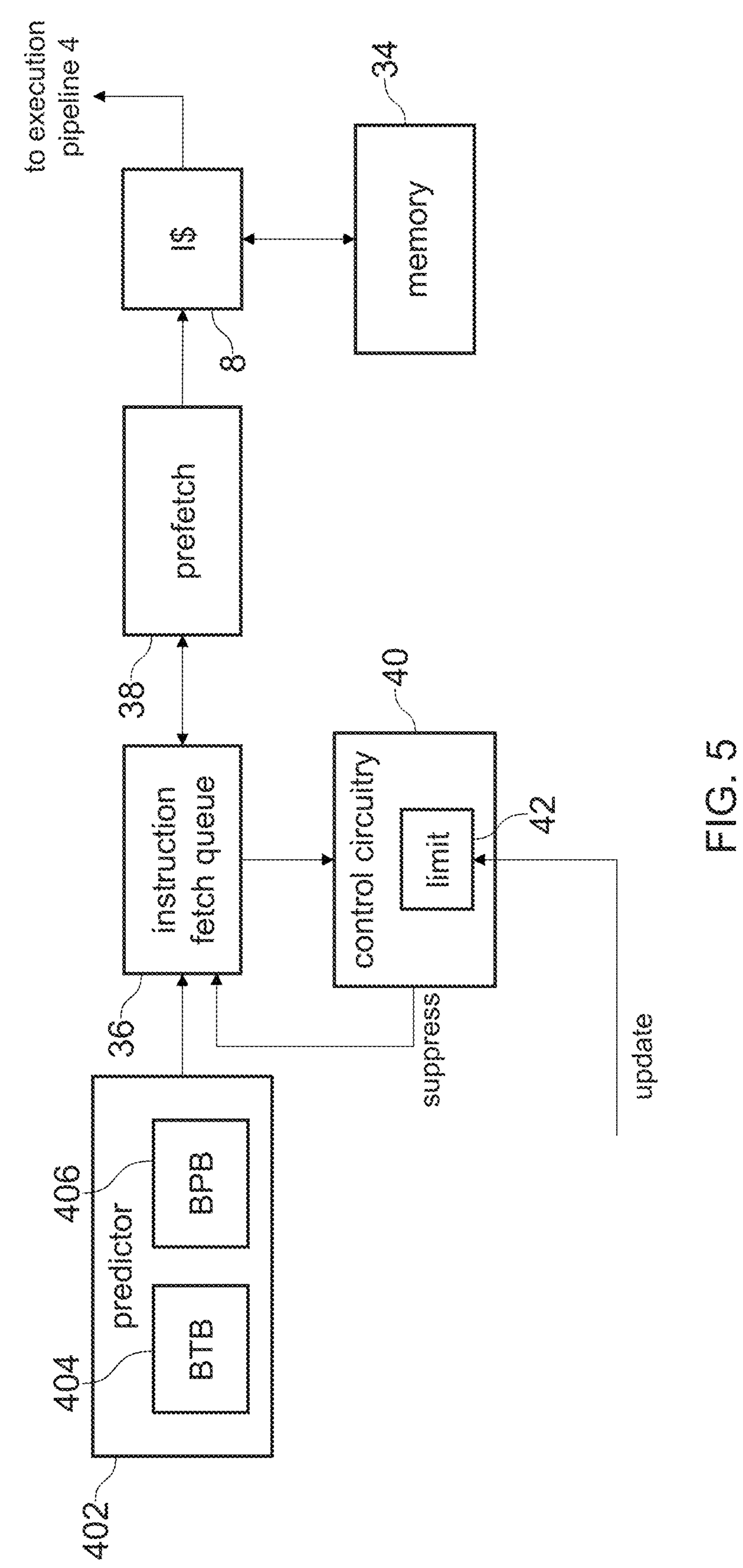
FIG. 5 schematically illustrates an apparatus according to some configurations of the present techniques.

FIG. 5 schematically illustrates an example apparatus 400 according to the present techniques. The apparatus 400 comprises prediction circuitry 402 configured to predict whether a block of instructions comprises a branch instruction, whether a branch instruction is expected to be taken or not taken, and the target of any taken branch instructions. Using these predictions, the prediction circuitry 402 generates corresponding instruction fetch entries for allocation to the instruction fetch queue 36. Some instructions may be branch instructions, and the prediction circuitry 402 is configured to predict the outcome of the branch instructions. In particular, the prediction circuitry 402 comprises a branch target buffer (BTB) 404 for predicting the target of a taken branch instruction and a branch prediction buffer (BPB) 406 for predicting a taken or not taken outcome for a particular branch instruction. It will be appreciated that the prediction circuitry 402 may include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

The prediction circuitry 402 receives signals from the branch unit 24 (as illustrated in FIG. 3) indicating actual branch outcomes of branch instructions, such as an indication of whether an instruction was a branch instruction, whether such a branch instruction was taken, and if so the target address of that branch instruction. This information is provided to the BTB 404 and BPB 406 accordingly so that a correct prediction is more likely to be made if the same block of instructions is encountered again. If the prediction circuitry 402 has not been provided with the necessary information to make a prediction, a default prediction may be generated. For example, without information indicating the contrary, the prediction circuitry 402 defaults to a prediction of not present or not taken.

When the prediction circuitry 402 generates an instruction fetch entry, the instruction fetch entry is then sent to the instruction fetch queue 36 as described relation to FIG. 2 and requests to fetch the blocks of instructions (i.e., line fill requests to the L2 cache 32) may be issued by the prefetching circuitry 38 in dependence on whether the number of outstanding requests exceeds the limit value 42. As described in relation to FIG. 4, the control circuitry is configured to derive the limit value 42 and to suppress issuing of the line fill requests in response to a number of outstanding line fill requests exceeding the limit value 42. In the apparatus 400, the limit value 42 is capable of being dynamically modified/updated based on properties determined before or during storage of the one or more previously fetched blocks of instructions in the instruction storage.

Figure 6:
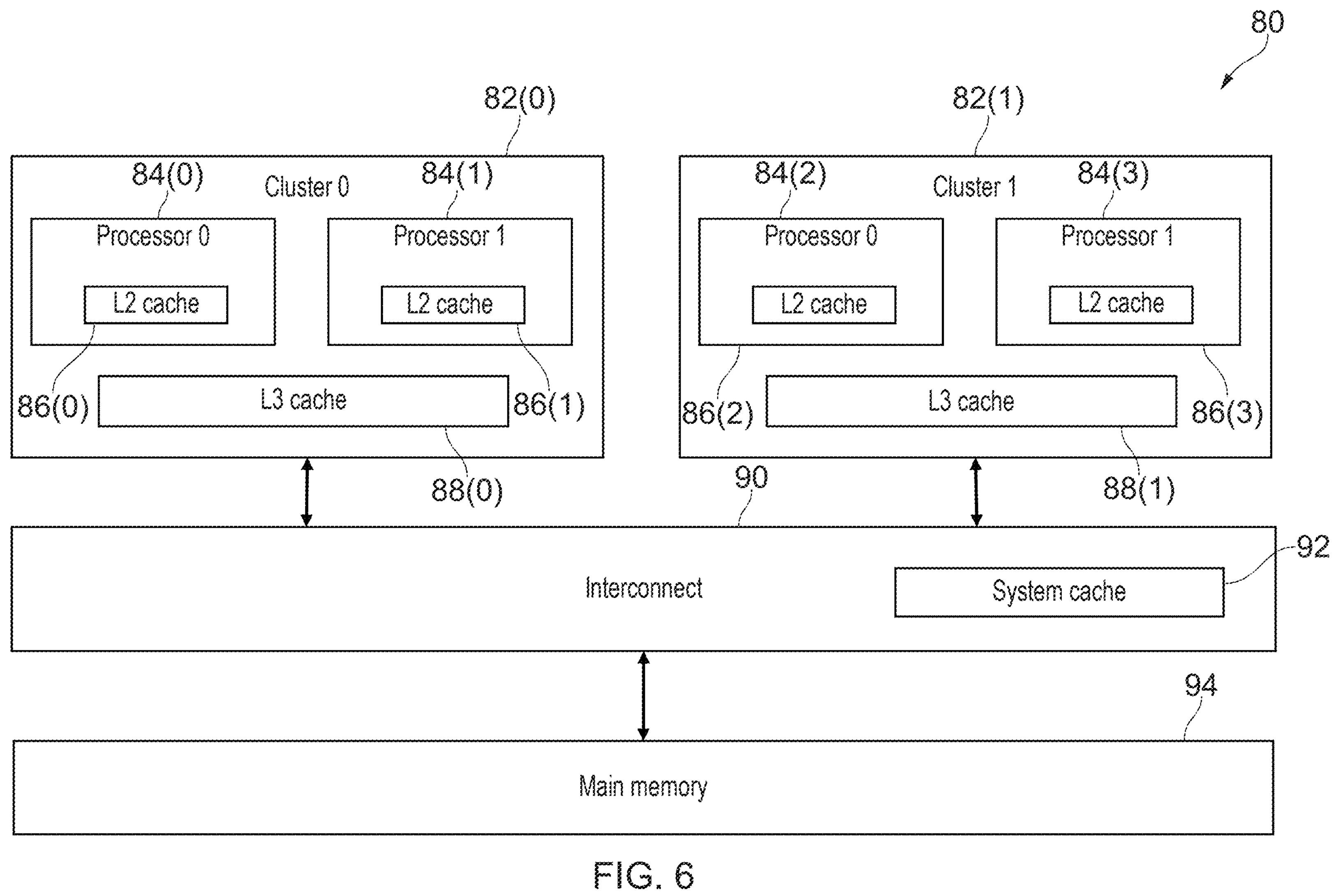
FIG. 6 schematically illustrates an apparatus according to some configurations of the present techniques.

The variable throttling threshold (the limit value 42) may be derived based on properties including, for example, location data. In some configurations, the location data comprises storage location data. FIG. 6 schematically illustrates an apparatus 80 comprising a number of storage locations that may be identified in storage location data from which the control circuitry 40 derives the variable throttling threshold. The apparatus 80 comprises a first cluster 82(0) and a second cluster 82(1), each cluster 82 comprises plural instances of processing circuitry 84. The first cluster 82(0) comprises first processing circuitry 84(0) and second processing circuitry 84(1). The second cluster 82(1) comprises first processing circuitry 84(2) and second processing circuitry 84(3). Each instance of processing circuitry 84 is provided with an L2 cache 86. Each cluster 82 is provided with an L3 cache 88. The first cluster 82(0) and the second cluster 82(1) are connected via an interconnect 90 which is provided with its own system cache 92. The interconnect 90 is also connected to main memory 94.

The apparatus 80 is therefore provided with a plurality of different levels of storage circuitry including the L2 caches 86, the L3 caches 88, the system cache 92, and the main memory 94. Each instance of processing circuitry 84 may also be arranged as described in relation to FIGS. 3 and 6 with an instruction cache 8, an instruction fetch queue 36, prefetching circuitry 38 and control circuitry 40. Requests to fetch blocks of instructions issued by one of the instances of processing circuitry 84 may trigger a block of instructions to be retrieved from one of the L2 caches 86, the L3 caches 88, the system cache 92, and the main memory 94. The fetched block of instructions is returned with storage structure location data indicative of the storage structure from which that block of instructions was fetched. For example, if the block of instructions is fetched from the L2 cache 86 associated with the processing circuitry issuing the request, then the block of instructions is returned with storage structure location data indicating that the data was retrieved from the L2 cache. Similarly, if the requested block of instructions is returned from the system cache 92, then the requested block of instructions is returned with storage structure location data indicating that the block of instructions was retrieved from the system cache 92. The control circuitry 40 comprised in the processing circuitry 84 that issued the request is therefore able to retrieve the block of instructions and storage structure location data identifying the storage structure from which the block of instructions has been retrieved. The location data can then be used, as will be described in further detail below, to determine the variable throttling threshold (the limit value 42).

It will be readily apparent to the person of ordinary skill in the art that the illustrated arrangement of clusters and caches is provided for illustrative purpose only and that any arrangement comprising a different number of clusters, processors, or cache levels may also be provided.

Figure 7:
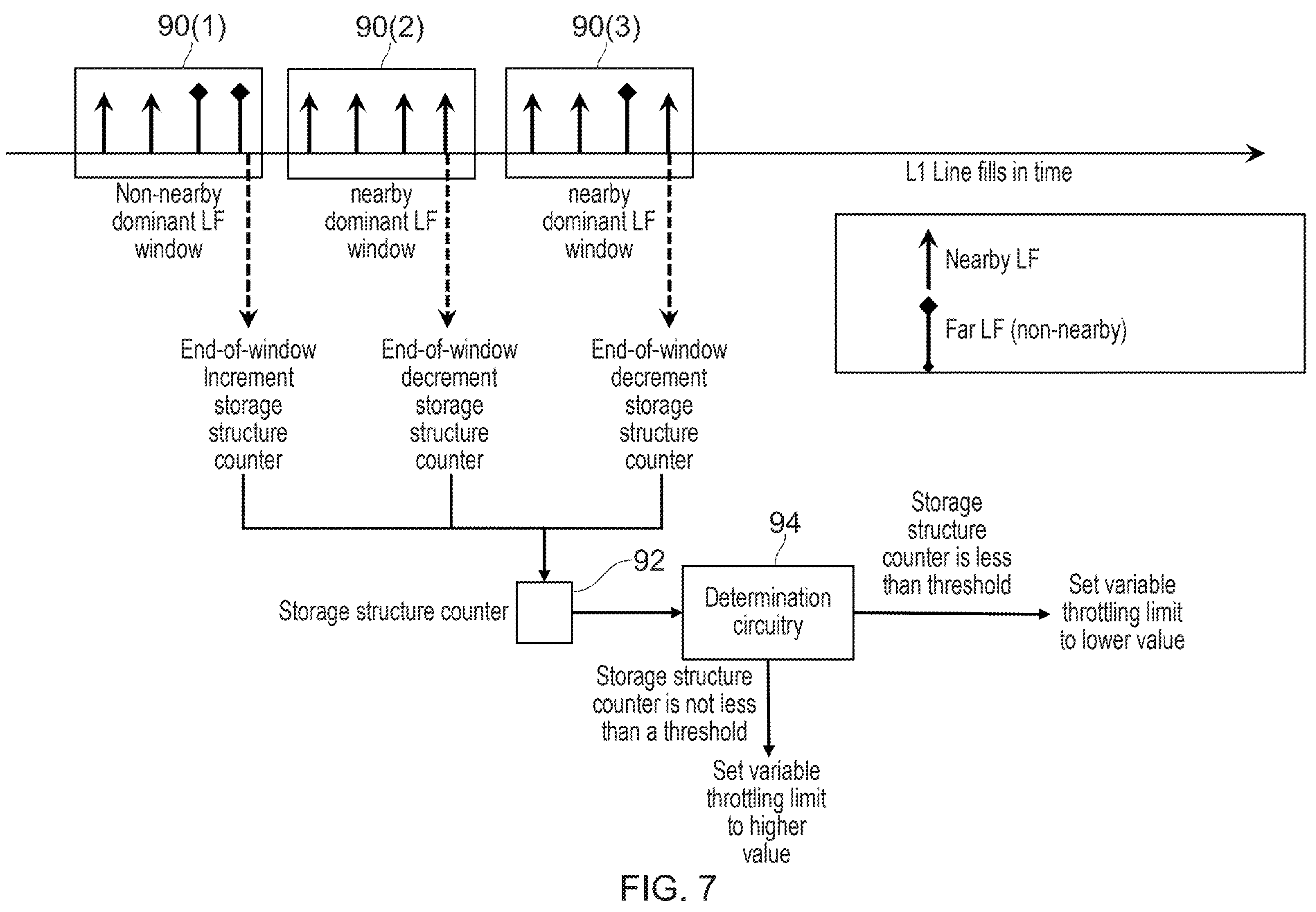
FIG. 7 schematically illustrates incrementing and decrementing a counter according to some configurations of the present techniques.

FIG. 7 schematically illustrates the use of the retrieved storage location data to determine the variable throttling threshold. The variable throttling threshold is determined based on a storage structure counter 92 that is incremented/decremented based on whether the blocks of instructions have been retrieved predominantly from nearby storage structures or from further away storage structures subsequent to a measurement window. FIG. 7 schematically illustrates three measurement windows 90 each comprising a predetermined number of issued requests. At the end of the measurement windows it is determined if the number of blocks of instructions that have been retrieved from nearby storage structures meets or exceeds a threshold. In the illustrated configuration, the threshold is met when 3 or more of the blocks of instructions are retrieved from nearby storage structures.

In the illustrated configuration the predetermined number of issued requests is four. Each of the issued requests is returned with storage location data indicative of the storage location from which that request was retrieved. The storage location data is compared to a predefined definition of a nearby storage structure. In the illustrated example, the nearby storage structure comprises the L2 caches 86 with all other storage structures being classified as non-nearby (further away) storage structures.

During a first measurement window 90(1), the first two requests are fulfilled by storage structures that are defined as nearby, i.e., the L2 storage structures 86. The remaining two requests are fulfilled by storage structures that are identified as being non-nearby storage structures, for example, the L3 cache 88, the system cache 92, or the main memory 94. As a result, at the end of the first measurement window 90(1) it is determined that the threshold is not met as only two of the four blocks of instructions were retrieved from nearby storage structures. The first measurement window 90(1) is therefore determined to be non-nearby dominant and the storage structure counter 92 is incremented.

During a second measurement window 90(2), all four requests are fulfilled by storage structures that are defined as nearby, i.e., the L2 storage structures 86. As a result, at the end of the first measurement window 90(2) it is determined that the threshold is met as all of the four blocks of instructions were retrieved from nearby storage structures. The first measurement window 90(2) is therefore determined to be nearby dominant and the storage structure counter 92 is decremented.

During a third measurement window 90(3), the first two requests and the fourth request are fulfilled by storage structures that are defined as nearby, i.e., the L2 storage structures 86. The remaining request is fulfilled by storage structures that are identified as being non-nearby storage structures, for example, the L3 cache 88, the system cache 92, or the main memory 94. As a result, at the end of the first measurement window 90(1) it is determined that the threshold is met as three of the four blocks of instructions were retrieved from nearby storage structures. The first measurement window 90(1) is therefore determined to be nearby dominant and the storage structure counter 92 is decremented.

The variable throttling limit is set based on the storage structure counter 92. The storage structure counter 92 is fed to determination circuitry 94 which determines if the storage structure counter is less than a threshold. If the determination circuitry 94 determines that the storage structure counter 92 is less than a threshold, then the variable throttling limit is set to a lower value. If the determination circuitry 94 determines that the storage structure counter 92 is greater than or equal to a threshold, then the variable throttling limit is set to a higher value.

Figure 8:
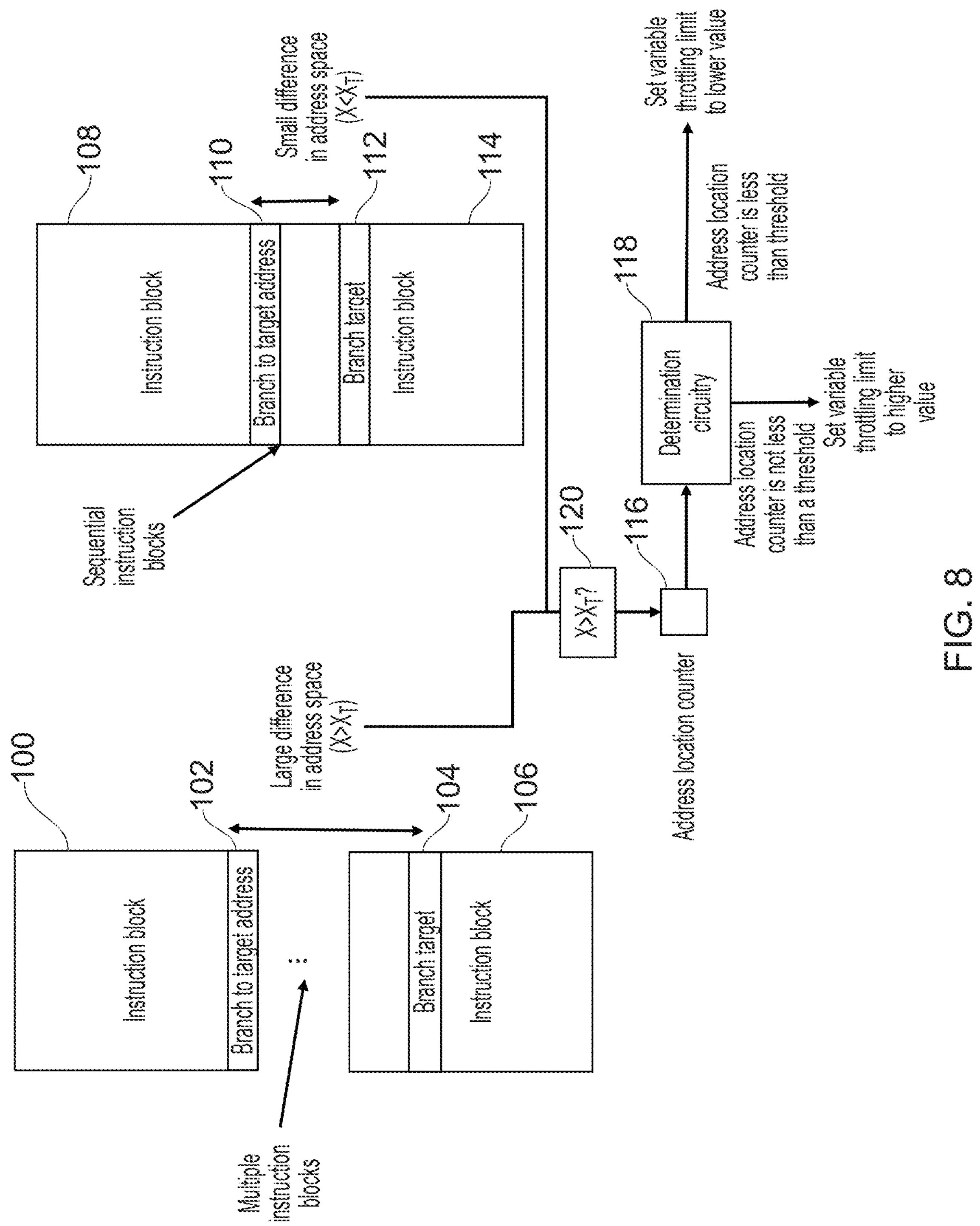
FIG. 8 schematically illustrates a difference in address space between instructions according to some configurations of the present techniques.

FIG. 8 schematically illustrates a method of determining program counter location data which may be used as an alternative to, or in addition to, the storage structure location data described above. The program counter location data identifies a difference in address space between an address of a branch instruction and a target address specified in a branch instruction. The difference in address space (denoted X) is then compared to a threshold (denoted $X_T$). If the difference in address space exceeds the threshold, then an address location counter 116 is decreased and, if the difference does not exceed the threshold, then the address location counter 116 is increased. The address location counter 116 is then compared to a further threshold by determination circuitry 118 to determine if the variable throttling limit is to be increased or decreased.

The left hand side of FIG. 8 schematically illustrates a first block of instructions 100 comprising a branch instruction 102 which specifies a target address 104. The target address 104 is an address of a branch instruction in a further block of instructions 106. In this first example, there is a large difference in address space between the address of the branch instruction 102 and the target address 104. In particular, the block of instructions 100 comprising the branch instruction 102 and the further block of instructions 106 comprising the target address 104 are not consecutive blocks of instructions in virtual address space. The difference in address space may result from the block of instructions 100 and the further block of instructions 106 being separated by a single other block of instructions (not illustrated) or the separation may be plural blocks of instructions. In general, the separation between the between the branch instruction 102 and the target address 104 may be X blocks of instructions. The control circuitry applies a threshold to the difference, e.g., the control circuitry determines if $X>X_T$ where $X_T$ is a threshold that may be hardwired into the control circuitry, stored in a dedicated register, or stored as part of metadata at a known storage location. In the illustrated configuration, the difference in address space is greater than $X_T$. Hence, when the difference in address space is compared against the threshold by comparison circuitry 120, it is determined that X is greater than $X_T$ and the address location counter 116 is decremented. As a result, when the encountered branch instructions typically result in a taken branch having a large change in program counter value, the address location counter will typically decrement and cause the variable throttling limit to be set to a lower value.

The right hand side of FIG. 8 schematically illustrates a first block of instructions 108 comprising a branch instruction 110 which specifies a target address 112. The target address 112 is an address of a branch instruction in a further block of instructions 114. In this second example, the block of instructions 108 and the further block of instructions 114 are consecutive blocks of instructions resulting in a small difference in address space. The control circuitry applies a threshold to the difference, e.g., the control circuitry determines if $X>X_T$ where $X_T$ is a threshold that may be hardwired into the control circuitry, stored in a dedicated register, or stored as part of metadata at a known storage location. In the illustrated configuration, the difference in address space is less than $X_T$. Hence, when the difference in address space is compared against the threshold by comparison circuitry 120, it is determined that X is smaller than $X_T$ and the address location counter 116 is incremented. As a result, when the encountered branch instructions typically result in a taken or a non-taken branch having a small change in program counter value, the address location counter will typically increment and cause the variable throttling limit to be set to a higher value.

Figure 9:
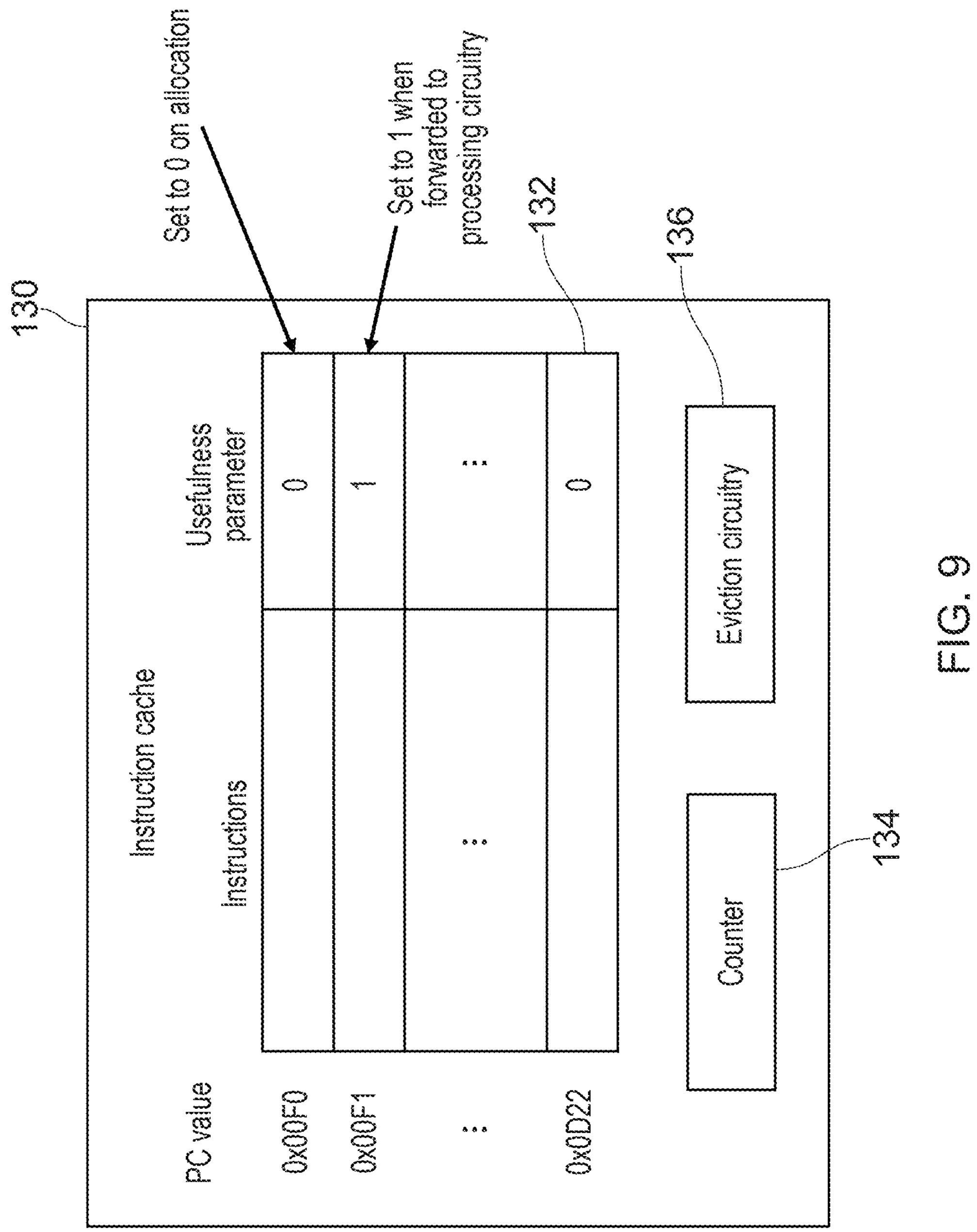
FIG. 9 schematically illustrates instruction storage circuitry according to some configurations of the present techniques.

FIG. 9 schematically illustrates a further example using an instruction cache 130 to derive parameters from which the variable throttling rate may be set. In the illustrated configuration, the parameters are usefulness parameters which may be used in combination with, or as an alternative to, the location data described above. The instruction cache 130 (an example of instruction storage circuitry) stores blocks of instructions indexed based on the program counter value. In association with the stored instructions, the instruction cache 130 stores a usefulness parameter for each of those instructions. The instruction cache 130 also comprises a usefulness counter 134 and eviction circuitry 136. The illustrated instruction cache 130 is arranged as an indexed cache, however, it will be readily apparent to the skilled person that a set associative cache or a fully associative cache could be provided in addition to or as an alternative to the instruction cache 130.

When a block of instructions is received by the instruction cache 130, the block of instructions is allocated, for example, according to an allocation procedure, in the cache. The block of instructions is stored along with the usefulness parameter which is initially set to 0 on allocation. The usefulness parameter indicates that the block of instructions has been stored in the instruction cache but has not yet been forwarded to processing circuitry for execution.

When a block of instructions is forwarded to the processing circuitry for execution, it is retrieved from the cache, i.e., a lookup is performed based on an index generated from a program counter value and, if the result hits in the instruction cache, the block of instructions is retrieved from the cache and forwarded to the processing circuitry. In addition, when the block of instructions is forwarded to the processing circuitry for execution, the usefulness parameter associated with that block of instructions is set to 1. In this way, the instruction cache 130 is able to keep track of which blocks of instructions have been forwarded for execution and which blocks of instructions have not yet been forwarded for execution.

The eviction circuitry 136 is configured to select blocks of instructions for eviction based on one or more eviction policies. For example, the eviction circuitry 136 may choose to evict a least recently updated block of instructions, for example, in order to free up space for a newly received block of instructions. When the eviction circuitry selects a block of instructions for eviction, the eviction circuitry 136 reads the usefulness parameter associated with that block of instructions and updates the usefulness counter 134 based on the value of the usefulness parameter. When the usefulness parameter is 1, indicating that the block of instructions has been forwarded for processing by the processing circuitry, the eviction circuitry 136 decrements the usefulness counter 134. When the usefulness parameter is 0, indicating that the block of instructions has not been forwarded for processing by the processing circuitry, the eviction circuitry 136 increments the usefulness counter 134. The usefulness counter is arranged as a saturating counter and takes a low value when the majority of evicted blocks of instructions are evicted after being forwarded for execution by the processing circuitry, and takes a high value when the majority of evicted blocks of instructions are evicted before without being forwarded for execution.

Figure 10:
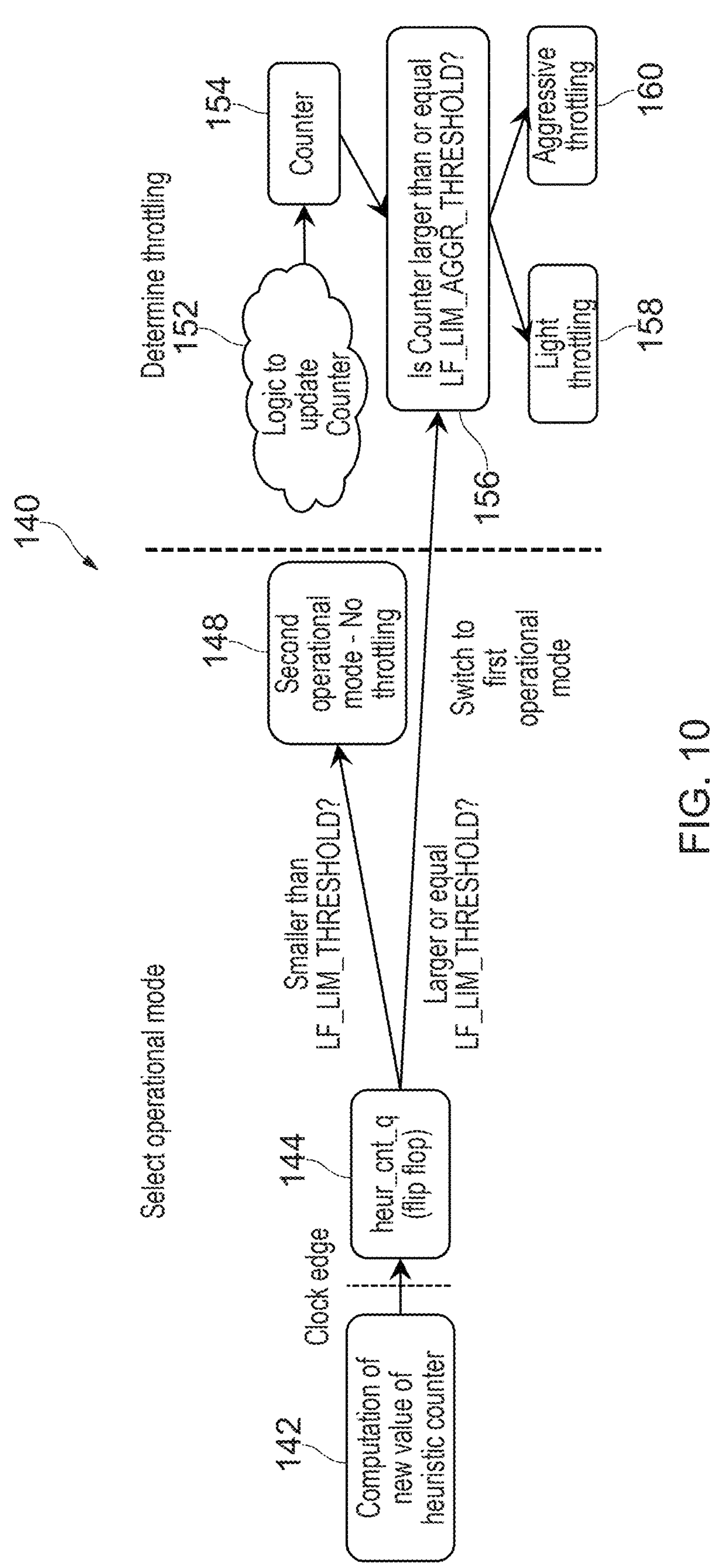
FIG. 10 schematically illustrates throttling according to some configurations of the present techniques.

FIG. 10 schematically illustrates an apparatus 140 according to some configurations of the present techniques. The apparatus 140 is operable in at least two operational modes, a first operational mode in which the variable throttling threshold is applied, and a second operational mode in which no throttling is applied. The apparatus is configured to first select the operational mode, and second to determine the variable throttling threshold when operating in the first operational mode.

In order to select the operational mode, the apparatus 140 first computes a value of a heuristic counter 142. This counter may be based on the counters described above and/or may be based on, e.g., a ratio of branch target buffer misses and a number of retired instructions. The counter value is fed to comparison circuitry 144 which determines if the heuristic counter is larger than or smaller than a threshold (LF_LIM_THRESHOLD). If the comparison circuitry 144 determines that the heuristic counter is smaller than a threshold, then the circuitry is switched to operate in the second operational mode 148 in which no throttling is applied. Alternatively, if the comparison circuitry 144 determines that the heuristic counter is larger than or equal to a threshold, then the circuitry is switched to operate in the first operational mode in which throttling is applied according to the variable throttling threshold.

In the first operational mode, the apparatus 140 applies logic 152 the techniques described above to a counter 154. The counter 154 is compared to a threshold, for example the threshold (LF_LIM_AGGR_THRESHOLD) 156 to determine the level of throttling. Where the counter 154 is not higher than the threshold, then an aggressive throttling 160 is applied as a variable throttling threshold. Where the counter 154 is higher than the threshold then a light throttling 158 is applied as the variable throttling threshold. Whilst, in the illustrated configuration, only a single counter 154 is provided, it will be readily apparent to the skilled person that, in alternative configurations, multiple counters (e.g., the usefulness counter, the storage structure counter, and/or the address location counter) could be provided and that the comparison 156 could be based on a combination of those counters as will be described in further detail below.

Figure 11:
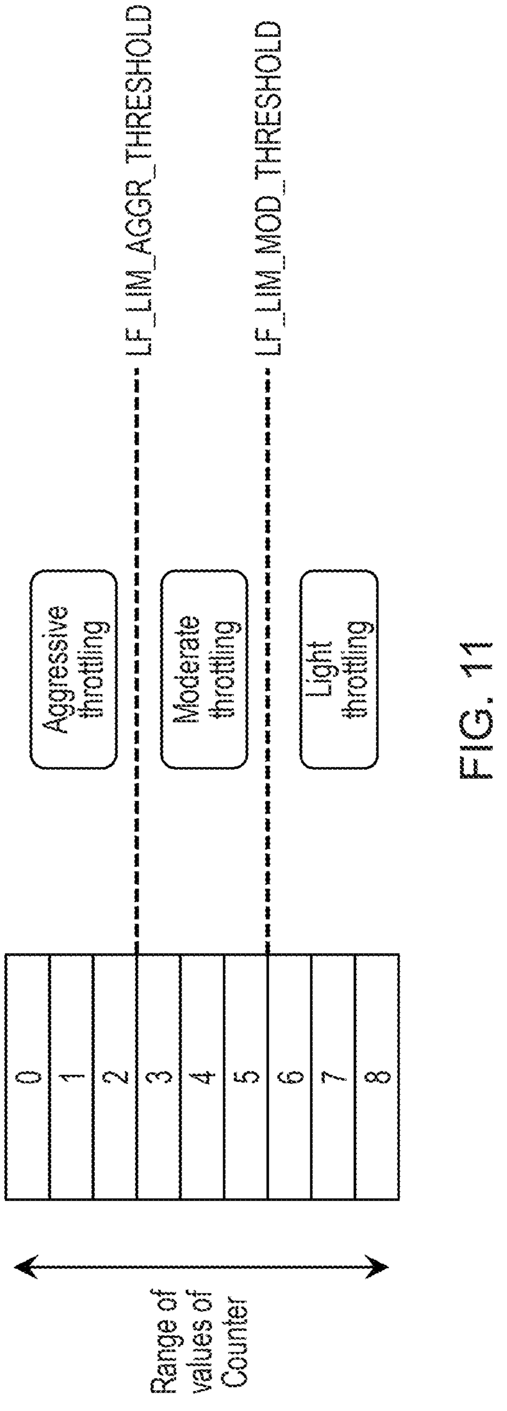
FIG. 11 schematically illustrates throttling according to some configurations of the present techniques.

The variable throttling threshold illustrated in FIG. 10 takes one of two values, the aggressive throttling threshold, and the light throttling threshold. FIG. 11 schematically illustrates an alternative configuration in which the variable throttling threshold may take one of three values, an aggressive throttling threshold, a moderate throttling threshold, and a light throttling threshold based on the counter values. In particular, the counter values may range, for example, from 0 to 8 with counter values of 0, 1, or 2 resulting in an aggressive throttling threshold, counter values of 3, 4, or 5 resulting in a moderate throttling threshold, and counter values of 6, 7, or 8 resulting in a light throttling threshold. It will be readily apparent to the skilled person that a finer grained set of throttling levels could also be applied dependent on the implementation.

FIG. 12 schematically illustrates the determination of a throttling level (aggressive, moderate or light) based on multiple counter values. In the illustrated configuration, the determination is based on the storage structure counter and the address location counter. In the illustrated configuration, the throttling level is determined based on a lookup involving both counter values with an aggressive level of throttling being selected when the sum of the storage structure counter value and the address location counter is less than or equal to 4, a moderate level of throttling being applied when the sum of the storage structure counter value and the address location counter value is between 5 and 7, and a light level of throttling being applied otherwise.

It will be readily apparent to the skilled person that a three-way lookup structure could also be provided with the variable throttling threshold being determined based on a combination of three counters. Alternatively, the throttling level could be determined by applying one or more arithmetic functions to the counter values.

Figure 13:
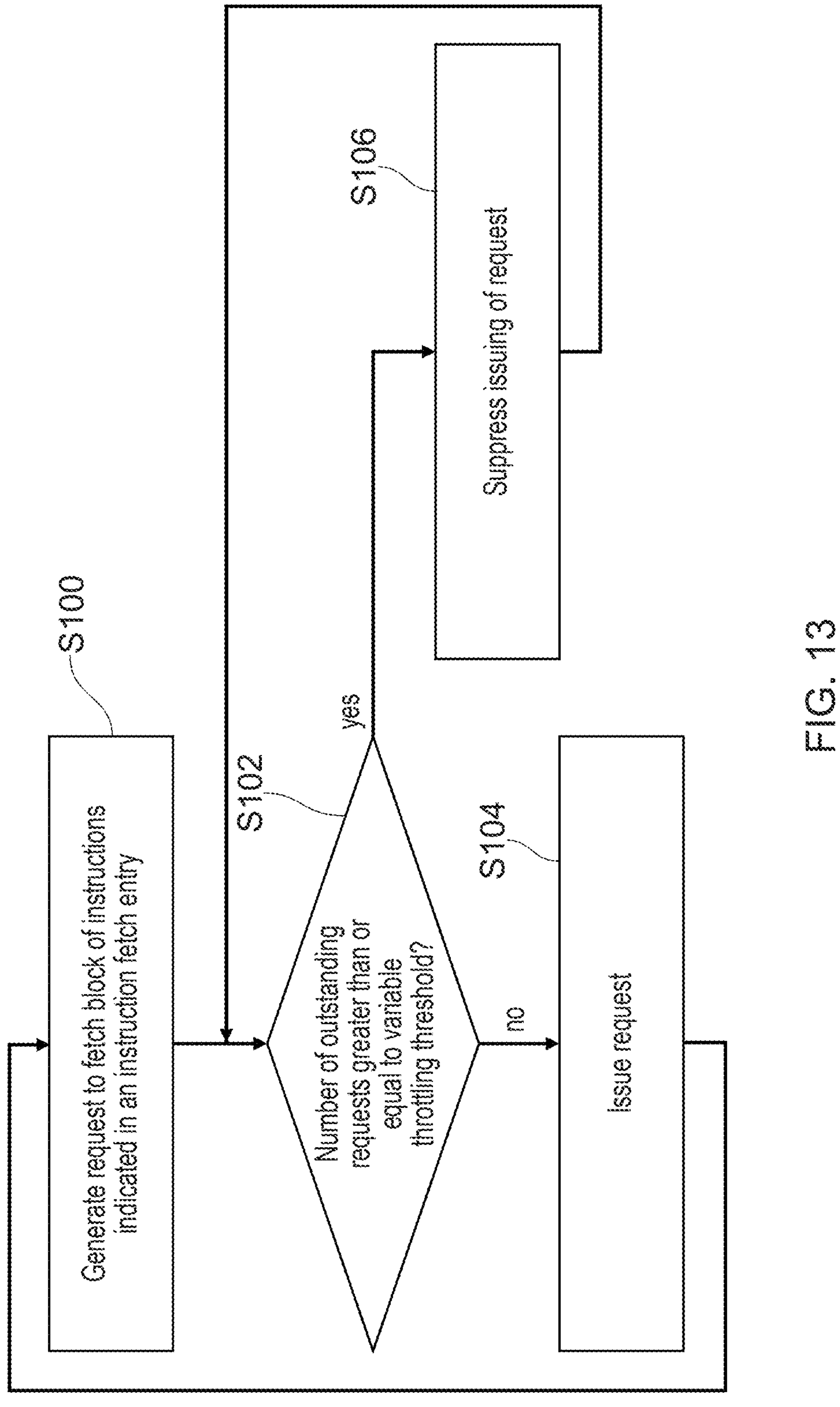
FIG. 13 schematically illustrates a sequence of steps according to some configurations of the present techniques.

FIG. 13 schematically illustrates a sequence of steps carried out according to some configurations of the present techniques when operating in a first operational mode. Flow begins at step S100 where a request to fetch a block of instructions indicated in an instruction fetch entry is generated. Flow then proceeds to step S102 where it is determined whether the number of outstanding requests is greater than or equal to a variable throttling threshold (for example, this may be determined based on the rolling window described above). If, at step S102, it is determined that the number of outstanding requests is not greater than the variable throttling threshold, then flow proceeds to step S104 where the request is issued before flow returns to step S100. If, at step S102, it is determined that the number of outstanding requests is greater than or equal to the variable throttling threshold, then flow proceeds to step S106 where the issuing of the request is suppressed before flow returns to step S102.

Figure 14:
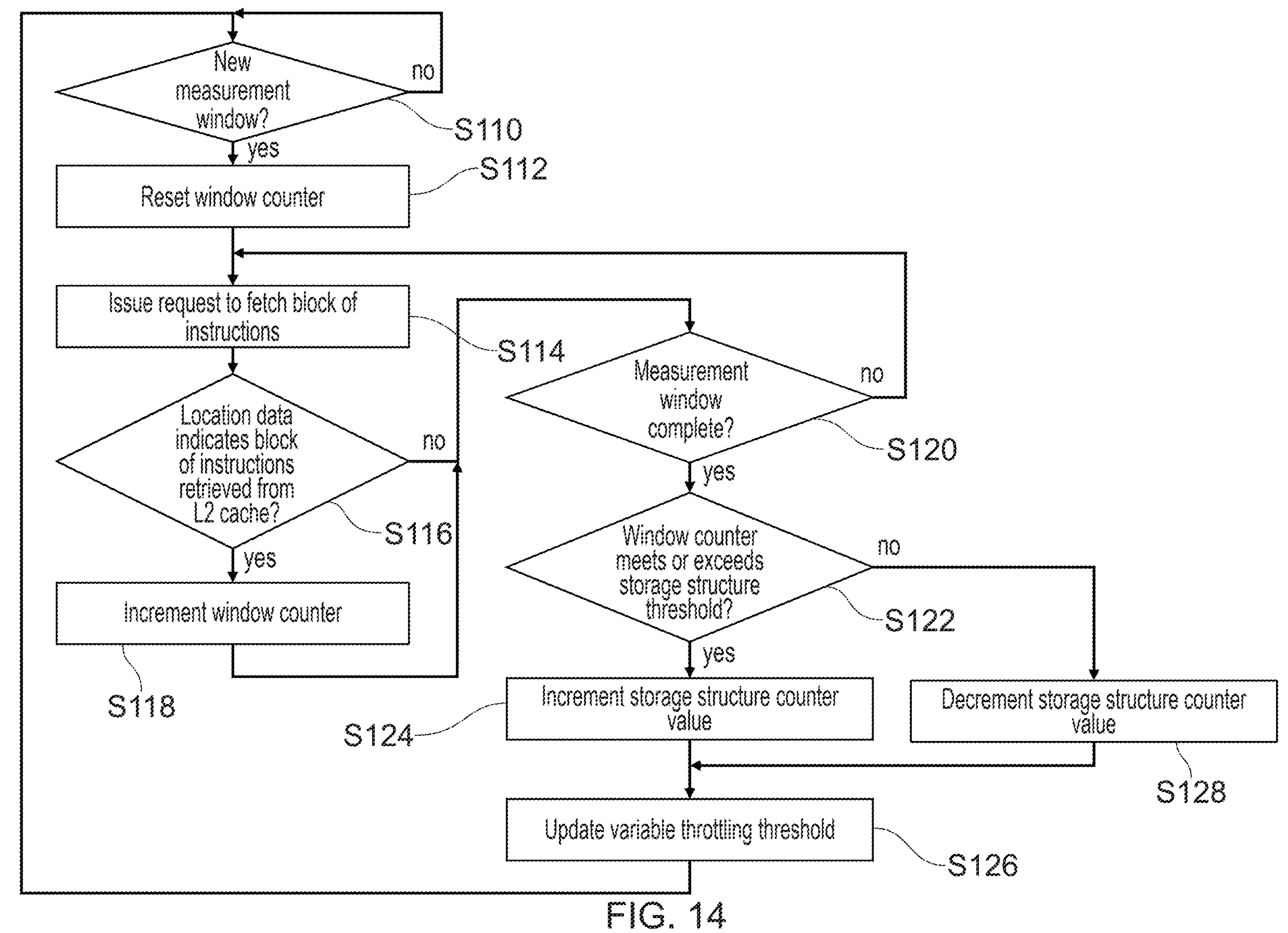
FIG. 14 schematically illustrates a sequence of steps according to some configurations of the present techniques.

FIG. 14 schematically illustrates a sequence of steps carried out according to some configurations of the present techniques in order to update the variable throttling threshold. Flow begins at step S110 where it is determined if a new measurement window has begun. If, at step S110, it is determined that no new measurement window has begun, then flow remains at step S110. If, at step S110 it is determined that a new measurement window has begun, then flow proceeds to step S112 where a window counter is reset. Flow then proceeds to step S114 where a request to fetch a block of instructions is issued (e.g., a line fill request to the L2 cache). Flow then proceeds to step S116 where it is determined if location data indicated in the fetched block of instructions indicates that the instruction has been retrieved from the L2 cache. If, at step S116, it is determined that the location data indicates that the block of instructions was not retrieved from the L2 cache, then flow proceeds to step S120. If, at step S116, it is determined that the location data indicates that the block of instructions was retrieved from the L2 cache, then flow proceeds to step S118 where the window counter is incremented before flow proceeds to step S120. At step S120, it is determined if the measurement window is complete, e.g., if the number of issued fetch requests meets or exceeds a predefined number. If, at step S120, it is determined that the measurement window is not complete, then flow returns to step S114. If, at step S120, it is determined that the measurement window is complete, then flow proceeds to step S122. At step S122, it is determined whether the window counter meets or exceeds a storage structure threshold. If, at step S122, it is determined that the window counter does exceed the storage structure threshold, then flow proceeds to step S124 where the storage structure counter value is incremented before flow proceeds to step S126. If, at step S122, it is determined that the window counter does not meet or exceed the storage structure threshold, then flow proceeds to step S128 where the storage structure counter value is decremented before flow proceeds to step S126. At step S126, the variable throttling threshold is updated by applying a further threshold to the storage structure counter value, for example, as described in relation to FIGS. 11 and/or 12. Flow then returns to step S110.

Figure 15:
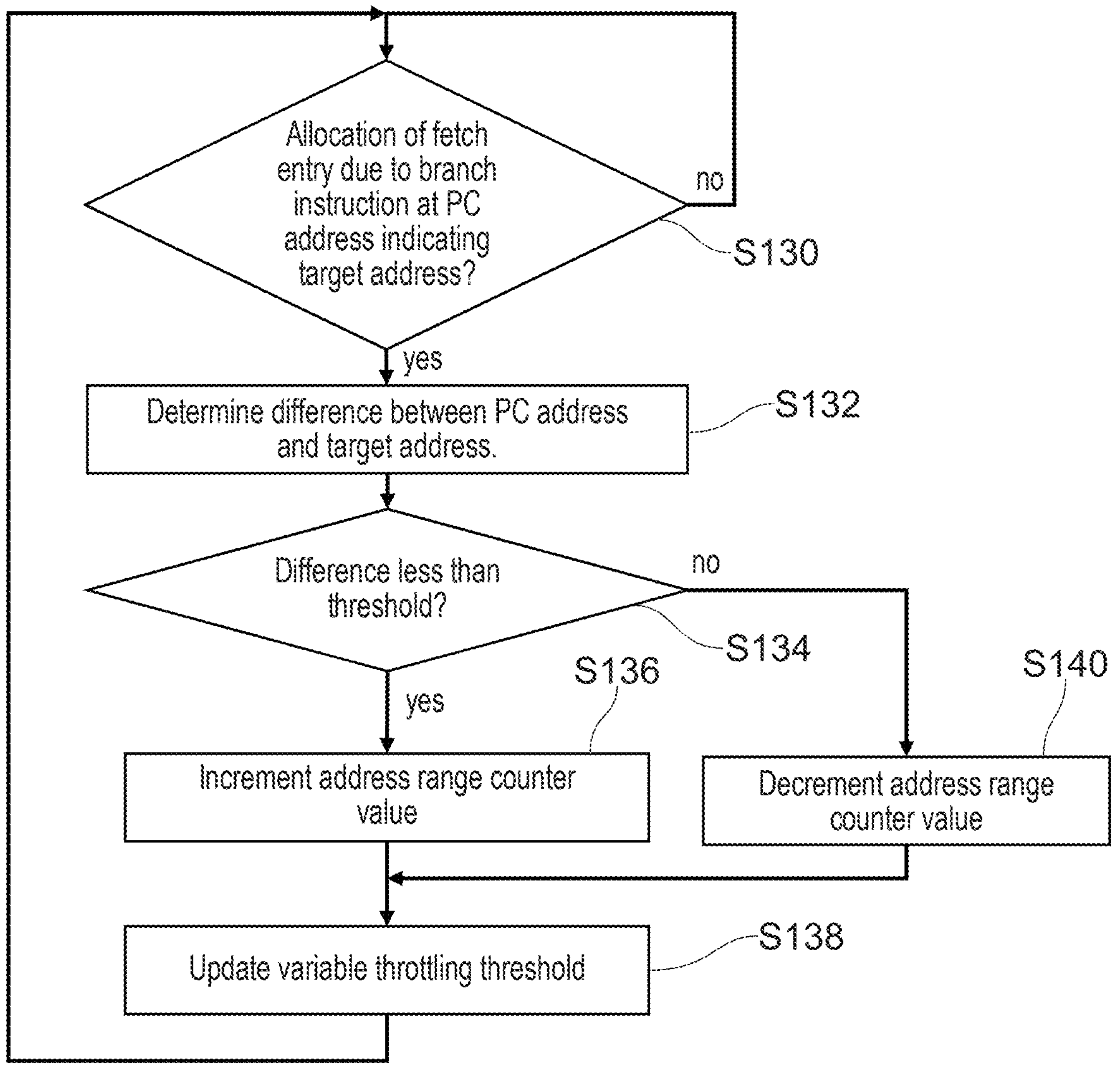
FIG. 15 schematically illustrates a sequence of steps according to some configurations of the present techniques.

FIG. 15 schematically illustrates a sequence of steps carried out according to some configurations of the present techniques in order to update the variable throttling threshold. Flow begins at step S130, where it is determined whether a fetch entry has been allocated due to a branch instruction at a program counter address indicating a target address. If, at step S130, it is determined that such a fetch entry has not been received, then flow remains at step S130. If, at step S130, it is determined that such fetch entry has been received, then flow proceeds to step S132. At step S132, a difference between the program counter address and the target address is determined before flow proceeds to step S134. At step S134, it is determined if the difference is less than a threshold. If, at step S134, it is determined that the difference is less than a threshold, then flow proceeds to step S136 where the address range counter value is incremented before flow proceeds to step S138. If, at step S134, it was determined that the difference was not less than a threshold, then flow proceeds to step S140 where the address range counter value is decremented before flow proceeds to step S138. At step S138, the variable throttling threshold is updated by applying a further threshold to the address range counter value, for example, as described in relation to FIGS. 11 and/or 12. Flow then returns to step S130.

Figure 16:
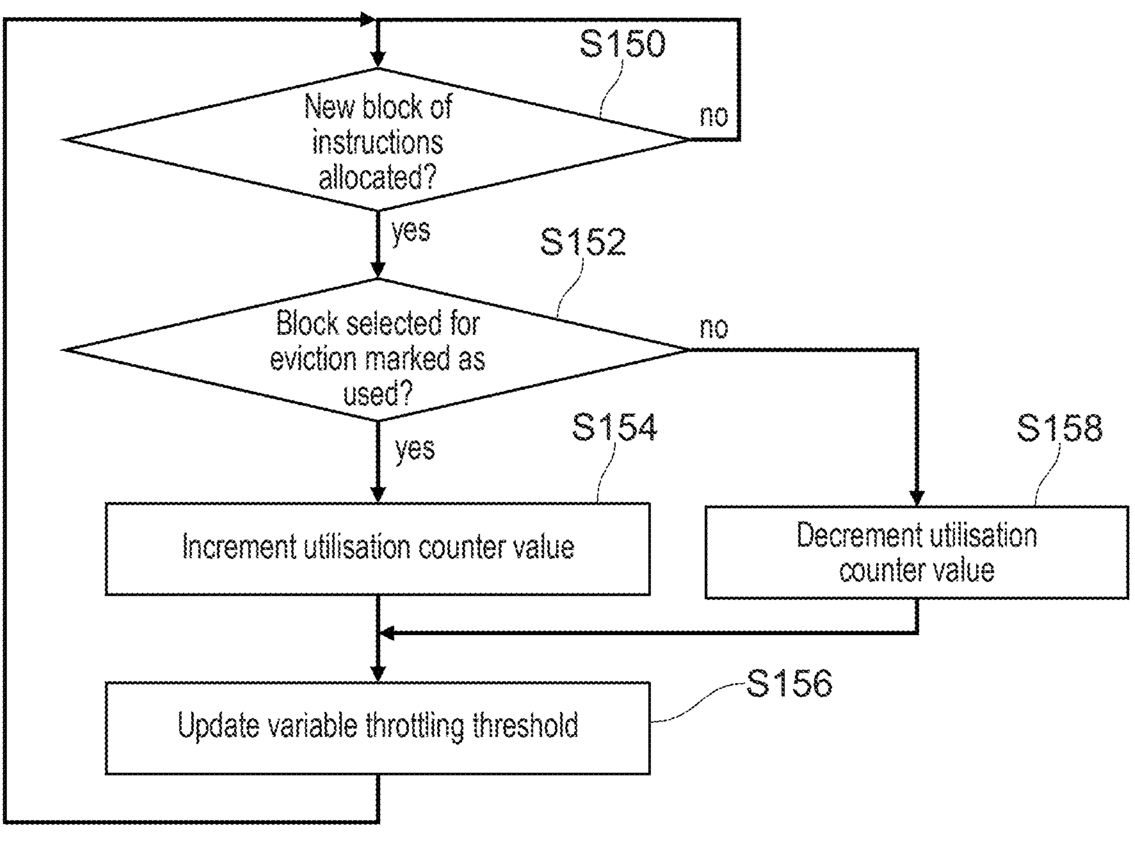
FIG. 16 schematically illustrates a sequence of steps according to some configurations of the present techniques.

FIG. 16 schematically illustrates a sequence of steps carried out according to some configurations of the present techniques in order to update the variable throttling threshold. Flow begins at step S150 where it is determined if a new block of instructions is being allocated into the instruction storage circuitry. If, at step S150, it is determined that a new block of instructions is not allocated into the instruction storage circuitry, then flow remains at step S150. If, at step S150, it is determined that a new block of instructions is to be allocated to the instruction storage circuitry, then flow proceeds to step S152. At step S152, it is determined whether a block selected for eviction is marked has having been used, i.e., having been forwarded to processing circuitry for execution. If, at step S152, it is determined that the block selected for eviction is marked as having been used, then flow proceeds to step S154 where the utilisation counter value is incremented before flow proceeds to step S156. If, at step S152, it is determined that the block selected for eviction is not marked as having been used, then flow proceeds to step S158 where the utilisation counter is decremented before flow proceeds to step S156. At step S156, the variable throttling threshold is updated by applying a further threshold to the utilisation counter value, for example, as described in relation to FIGS. 11 and/or 12. Flow then returns to step S150.

It will be readily apparent to the skilled person that where counters have been described as being incremented or decremented, the techniques described could also be implemented by decrementing or incrementing the respective counters with the threshold conditions appropriately switched.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 17:
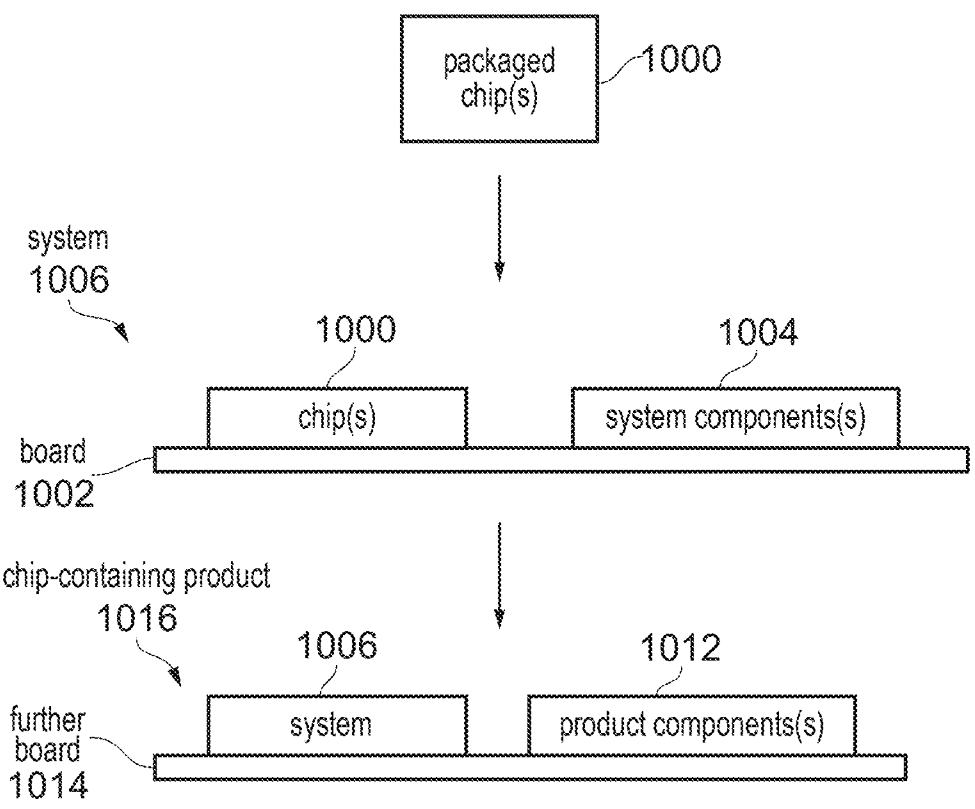
FIG. 17 schematically illustrates a system and a chip containing product according to some configurations of the present techniques.

As shown in FIG. 17, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus, a method, a chip containing product, a system and a medium. The apparatus is provided with an instruction fetch queue for storage of instruction fetch entries, and prefetching circuitry configured, for each instruction fetch entry and in response to a determination that a block of instructions indicated by that instruction fetch entry is not present in instruction storage circuitry, to issue a request to fetch the block and to cause the block to be allocated to the instruction storage circuitry. The apparatus is also provided with control circuitry configured to suppress issuing the request in response to a number of outstanding requests meeting or exceeding a variable throttling threshold. The control circuitry is configured to derive the variable throttling threshold from properties of previously fetched blocks, the properties determined before or during storage of the previously fetched blocks in the instruction storage circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:
- an instruction fetch queue for storage of instruction fetch entries;
- prefetching circuitry configured, for each of the instruction fetch entries and in response to a determination that a block of instructions indicated by that instruction fetch entry is not present in instruction storage circuitry, to issue a request to fetch the block of instructions and to cause the block of instructions to be allocated to the instruction storage circuitry; and
- control circuitry configured to operate in a first operation mode, wherein when operating in the first operation mode, the control circuitry is configured to suppress issuing the request in response to a number of outstanding requests to fetch blocks of instructions meeting or exceeding a variable throttling threshold, wherein the control circuitry is configured to derive the variable throttling threshold from properties of one or more previously fetched blocks of instructions, the properties determined before or during storage of the one or more previously fetched blocks of instructions in the instruction storage circuitry.

Clause 2. The apparatus of clause 1, comprising prediction circuitry configured to allocate the instruction fetch entries based on results of predictions of branch instructions and to indicate, for each of the instruction fetch entries, whether the block of instructions that instruction fetch entry is predicted to contain at least one branch instruction, wherein:
- the number of outstanding requests is a number of outstanding requests issued for instruction fetch entries allocated to the instruction fetch queue subsequent to a previously allocated youngest instruction fetch entry predicted to contain at least one branch instruction.

Clause 3. The apparatus of clause 1 or clause 2, wherein the control circuitry comprises counter storage circuitry configured to store one or more counter values, and the control circuitry is configured:
- to update each one of the one or more counter values in dependence on the properties meeting a predefined condition associated with that one of the one or more counter values; and
- to derive the variable throttling threshold by applying one or more thresholds to the one or more counter values.

Clause 4. The apparatus of clause 3, wherein the control circuitry is configured to derive the properties during measurement windows comprising a predetermined number of issued requests to fetch blocks of instructions, and to update each of the one or more counter values subsequent to each one of the measurement windows.

Clause 5. The apparatus of any preceding clause, wherein the properties comprise location data indicative of locations from which one or more previous blocks of instructions were fetched.

Clause 6. The apparatus of clause 5, wherein:
- the control circuitry is responsive to the location data indicating that the locations exceed a location threshold, to decrease the variable throttling threshold; and
- the control circuitry is responsive to the location data indicating that the locations do not exceed a location threshold, to increase the variable throttling threshold.

Clause 7. The apparatus of clause 5 or clause 6, wherein the location data comprises storage structure location data indicative of a storage structure from which the one or more previous blocks of instructions were fetched.

Clause 8. The apparatus of clause 7, wherein:
- the prefetching circuitry is configured to fetch the block of instructions from a storage structure hierarchy comprising one or more first storage structures and one or more second storage structures, the one or more first storage structures accessible to the prefetching circuitry in fewer clock cycles than the one or more second storage structures; and
- the control circuitry is configured to determine the storage structure location data based on a number of retrieved blocks of instructions from at least one of the one or more first storage structures and the one or more second storage structures.

Clause 9. The apparatus of clause 8, when dependent on clause 3, wherein:
- the one or more counter values comprises a storage structure counter value; and
- the predefined condition associated with the storage structure counter value is met when the number of retrieved blocks of instructions from the one or more first storage structures meets or exceeds a storage structure threshold.

Clause 10. The apparatus of clause 5 or clause 6, comprising prediction circuitry configured to generate the instruction fetch entries based on branch instructions, each of the branch instructions located at a respective program counter address and specifying a respective target address, wherein the location data comprises program counter location data indicative of a difference between the respective program counter addresses and a respective target address.

Clause 11. The apparatus of clause 10, wherein the control circuitry is configured to determine the program counter location data for each of the instruction fetch entries.

Clause 12. The apparatus of clause 10 or clause 11, when dependent on clause 3, wherein:

the one or more counter values comprises an address location counter value; and the predefined condition associated with the address location counter value is met when a number of fetch entries for which the difference falls within a predefined range meets or exceeds an address range threshold.

Clause 13. The apparatus of clause 12, wherein the predefined range is one of:

a symmetric range and the predefined condition is satisfied when the modulus of the difference is less than or equal to a threshold;

an asymmetric range bounded from above zero by an upper threshold and from below zero by a lower threshold, wherein the modulus of the lower threshold is different to the modulus of the upper threshold.

Clause 14. The apparatus of any preceding clause, wherein the properties comprise utilisation properties indicative of whether, prior to eviction from the instruction storage circuitry, blocks of instructions selected for eviction from the instruction storage circuitry were forwarded to processing circuitry for execution.

Clause 15. The apparatus of clause 14, when dependent on clause 3, wherein:

the one or more counter values comprises a usefulness counter value; and the predefined condition associated with the usefulness counter value is met when the utilisation properties meets or exceeds a utilisation threshold.

Clause 16. The apparatus of any preceding clause, wherein the control circuitry is configured to operate in a second operational mode, wherein when operating in the second operational mode the control circuitry is configured to issue requests to fetch blocks of instructions independent of the number of the outstanding requests meeting or exceeding the variable throttling threshold.

Clause 17. The apparatus of clause 16, wherein the control circuitry is configured to switch between the first mode of operation and the second mode of operation in dependence on utilisation properties indicative of whether blocks of instructions evicted from the instruction storage circuitry were forwarded to processing circuitry prior to eviction.

Clause 18. The apparatus of any of clauses 14 to 17, comprising utilisation information storage circuitry configured to store instruction utilisation information associated with each block of instructions allocated to the instruction storage circuitry, wherein the control circuitry is configured:

when allocating a given block of instructions in the instruction storage circuitry, to set the instruction utilisation information associated with the given block of instructions to a first value;

in response to the given block of instructions being forwarded to processing circuitry, to set the instruction utilisation information associated with the given block of instructions to a second value different to the first value; and to derive the utilisation properties based on a ratio of the blocks of instructions evicted from the instruction storage circuitry for which the associated instruction utilisation information is set to the first value to the blocks of instructions evicted from the instruction storage circuitry for which the associated instruction utilisation information is set to the second value.

Clause 19. A system comprising:

the apparatus of any preceding clause, implemented in at least one packaged chip;

at least one system component; and a board, wherein the at least one packaged chip and the at least one system component are assembled on the board.

Clause 20. A chip-containing product comprising the system of clause 19, wherein the system is assembled on a further board with at least one other product component.

Clause 21. A method comprising:

storing instruction fetch entries in an instruction fetch queue;

for each of the instruction fetch entries and in response to a determination that a block of instructions indicated by that instruction fetch entry is not present in instruction storage circuitry, issuing a request to fetch the block of instructions and causing the block of instructions to be allocated to the instruction storage circuitry; and deriving a variable throttling threshold from properties of one or more previously fetched blocks of instructions, the properties determined before or during storage of the one or more previously fetched blocks of instructions in the instruction storage circuitry; and when operating in the first operation mode suppressing issuing the request in response to a number of outstanding requests to fetch blocks of instructions meeting or exceeding the variable throttling threshold.

Clause 22. A non-transitory computer-readable medium storing computer-readable code for fabrication of the apparatus of any of clauses 1 to 20.

We claim:

1. An apparatus comprising:

an instruction fetch queue for storage of instruction fetch entries;

prefetching circuitry configured, for each of the instruction fetch entries and in response to a determination that a block of instructions indicated by that instruction fetch entry is not present in instruction storage circuitry, to issue a request to fetch the block of instructions and to cause the block of instructions to be allocated to the instruction storage circuitry; and control circuitry configured to operate in a first operation mode, wherein when operating in the first operation mode, the control circuitry is configured to suppress issuing the request in response to a number of outstanding requests to fetch blocks of instructions meeting or exceeding a variable throttling threshold, wherein the control circuitry is configured to derive the variable throttling threshold from properties of one or more previously fetched blocks of instructions, the properties determined before or during storage of the one or more previously fetched blocks of instructions in the instruction storage circuitry.

2. The apparatus of claim 1, comprising prediction circuitry configured to allocate the instruction fetch entries based on results of predictions of branch instructions and to indicate, for each of the instruction fetch entries, whether the block of instructions that instruction fetch entry is predicted to contain at least one branch instruction, wherein:

the number of outstanding requests is a number of outstanding requests issued for instruction fetch entries allocated to the instruction fetch queue subsequent to a previously allocated youngest instruction fetch entry predicted to contain at least one branch instruction.

3. The apparatus of claim 1, wherein the control circuitry comprises counter storage circuitry configured to store one or more counter values, and the control circuitry is configured:

to update each one of the one or more counter values in dependence on the properties meeting a predefined condition associated with that one of the one or more counter values; and to derive the variable throttling threshold by applying one or more thresholds to the one or more counter values.

4. The apparatus of claim 3, wherein the control circuitry is configured to derive the properties during measurement windows comprising a predetermined number of issued requests to fetch blocks of instructions, and to update each of the one or more counter values subsequent to each one of the measurement windows.

5. The apparatus of claim 1, wherein the properties comprise location data indicative of locations from which one or more previous blocks of instructions were fetched.

6. The apparatus of claim 5, wherein:

the control circuitry is responsive to the location data indicating that the locations exceed a location threshold, to decrease the variable throttling threshold; and the control circuitry is responsive to the location data indicating that the locations do not exceed a location threshold, to increase the variable throttling threshold.

7. The apparatus of claim 5, wherein the location data comprises storage structure location data indicative of a storage structure from which the one or more previous blocks of instructions were fetched.

8. The apparatus of claim 7, wherein:

the prefetching circuitry is configured to fetch the block of instructions from a storage structure hierarchy comprising one or more first storage structures and one or more second storage structures, the one or more first storage structures accessible to the prefetching circuitry in fewer clock cycles than the one or more second storage structures; and the control circuitry is configured to determine the storage structure location data based on a number of retrieved blocks of instructions from at least one of the one or more first storage structures and the one or more second storage structures.

9. The apparatus of claim 8, wherein:

the control circuitry comprises counter storage circuitry configured to store one or more counter values, and the control circuitry is configured:

to update each one of the one or more counter values in dependence on the properties meeting a predefined condition associated with that one of the one or more counter values; and to derive the variable throttling threshold by applying one or more thresholds to the one or more counter values;

the one or more counter values comprises a storage structure counter value; and the predefined condition associated with the storage structure counter value is met when the number of retrieved blocks of instructions from the one or more first storage structures meets or exceeds a storage structure threshold.

10. The apparatus of claim 5, comprising prediction circuitry configured to generate the instruction fetch entries based on branch instructions, each of the branch instructions located at a respective program counter address and specifying a respective target address, wherein the location data comprises program counter location data indicative of a difference between the respective program counter addresses and a respective target address.

11. The apparatus of claim 10, wherein:

the control circuitry comprises counter storage circuitry configured to store one or more counter values, and the control circuitry is configured:

to update each one of the one or more counter values in dependence on the properties meeting a predefined condition associated with that one of the one or more counter values; and to derive the variable throttling threshold by applying one or more thresholds to the one or more counter values;

the one or more counter values comprises an address location counter value; and the predefined condition associated with the address location counter value is met when a number of fetch entries for which the difference falls within a predefined range meets or exceeds an address range threshold.

12. The apparatus of claim 11, wherein the predefined range is one of:

a symmetric range and the predefined condition is satisfied when the modulus of the difference is less than or equal to a threshold;

an asymmetric range bounded from above zero by an upper threshold and from below zero by a lower threshold, wherein the modulus of the lower threshold is different to the modulus of the upper threshold.

13. The apparatus of claim 1, wherein the properties comprise utilisation properties indicative of whether, prior to eviction from the instruction storage circuitry, blocks of instructions selected for eviction from the instruction storage circuitry were forwarded to processing circuitry for execution.

14. The apparatus of claim 13, wherein:

the control circuitry comprises counter storage circuitry configured to store one or more counter values, and the control circuitry is configured:

to update each one of the one or more counter values in dependence on the properties meeting a predefined condition associated with that one of the one or more counter values; and to derive the variable throttling threshold by applying one or more thresholds to the one or more counter values;

the one or more counter values comprises a usefulness counter value; and the predefined condition associated with the usefulness counter value is met when the utilisation properties meets or exceeds a utilisation threshold.

15. The apparatus of claim 1, wherein:

the control circuitry is configured to operate in a second operational mode, wherein when operating in the second operational mode the control circuitry is configured to issue requests to fetch blocks of instructions independent of the number of the outstanding requests meeting or exceeding the variable throttling threshold; and the control circuitry is configured to switch between the first mode of operation and the second mode of operation in dependence on utilisation properties indicative of whether blocks of instructions evicted from the instruction storage circuitry were forwarded to processing circuitry prior to eviction.

16. The apparatus of claim 13, comprising utilisation information storage circuitry configured to store instruction utilisation information associated with each block of instructions allocated to the instruction storage circuitry, wherein the control circuitry is configured:

when allocating a given block of instructions in the instruction storage circuitry, to set the instruction utilisation information associated with the given block of instructions to a first value;

in response to the given block of instructions being forwarded to processing circuitry, to set the instruction utilisation information associated with the given block of instructions to a second value different to the first value; and to derive the utilisation properties based on a ratio of the blocks of instructions evicted from the instruction storage circuitry for which the associated instruction utilisation information is set to the first value to the blocks of instructions evicted from the instruction storage circuitry for which the associated instruction utilisation information is set to the second value.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A method comprising:

storing instruction fetch entries in an instruction fetch queue;

for each of the instruction fetch entries and in response to a determination that a block of instructions indicated by that instruction fetch entry is not present in instruction storage circuitry, issuing a request to fetch the block of instructions and causing the block of instructions to be allocated to the instruction storage circuitry; and deriving a variable throttling threshold from properties of one or more previously fetched blocks of instructions, the properties determined before or during storage of the one or more previously fetched blocks of instructions in the instruction storage circuitry; and when operating in a first operation mode suppressing issuing the request in response to a number of outstanding requests to fetch blocks of instructions meeting or exceeding the variable throttling threshold.

20. A non-transitory computer-readable medium storing computer-readable code for fabrication of an apparatus comprising:

an instruction fetch queue for storage of instruction fetch entries;

prefetching circuitry configured, for each of the instruction fetch entries and in response to a determination that a block of instructions indicated by that instruction fetch entry is not present in instruction storage circuitry, to issue a request to fetch the block of instructions and to cause the block of instructions to be allocated to the instruction storage circuitry; and control circuitry configured to operate in a first operation mode, wherein when operating in the first operation mode, the control circuitry is configured to suppress issuing the request in response to a number of outstanding requests to fetch blocks of instructions meeting or exceeding a variable throttling threshold, wherein the control circuitry is configured to derive the variable throttling threshold from properties of one or more previously fetched blocks of instructions, the properties determined before or during storage of the one or more previously fetched blocks of instructions in the instruction storage circuitry.

* * * * *